United States Patent
Toeda et al.

(10) Patent No.: US 11,447,650 B2
(45) Date of Patent: Sep. 20, 2022

(54) INKJET RECORDING LIQUID SET, PRINTED MATTER, AND INKJET RECORDING METHOD

(71) Applicant: Konica Minolta, Inc., Tokyo (JP)

(72) Inventors: Takayuki Toeda, Tokyo (JP); Haruka Moriyama, Musashino (JP)

(73) Assignee: KONICA MINOLTA, INC., Tokyo (JP)

( * ) Notice: Subject to any disclaimer, the term of this patent is extended or adjusted under 35 U.S.C. 154(b) by 151 days.

(21) Appl. No.: 17/000,759

(22) Filed: Aug. 24, 2020

(65) Prior Publication Data
US 2021/0071026 A1    Mar. 11, 2021

(30) Foreign Application Priority Data
Sep. 6, 2019    (JP) .............................. JP2019-162632

(51) Int. Cl.
*C09D 11/54*    (2014.01)
*B41M 5/00*    (2006.01)
(Continued)

(52) U.S. Cl.
CPC ........... *C09D 11/54* (2013.01); *B41M 5/0017* (2013.01); *C09D 11/322* (2013.01); *C09D 11/38* (2013.01); *C09D 175/04* (2013.01)

(58) Field of Classification Search
CPC . D06P 5/30; D06P 1/44; D06P 1/5285; C09D 11/322; C09D 11/30; C09D 11/36; C09D 11/54; B41J 3/4078; B41M 5/0017
See application file for complete search history.

(56) References Cited

U.S. PATENT DOCUMENTS

| | | | | |
|---|---|---|---|---|
| 5,510,415 A | * | 4/1996 | Zahrobsky | D06P 5/30 347/100 |
| 7,367,666 B2 | * | 5/2008 | Doi | B41J 3/60 347/100 |

(Continued)

FOREIGN PATENT DOCUMENTS

| | | |
|---|---|---|
| JP | 2015-124342 A | 7/2015 |
| JP | 2017-137461 A | 8/2017 |
| JP | 2018-016711 A | 2/2018 |

*Primary Examiner* — John Zimmermann
(74) *Attorney, Agent, or Firm* — Lucas & Mercanti, LLP

(57) ABSTRACT

Provides is an inkjet recording liquid set including at least an inkjet ink and a pretreatment liquid, wherein the inkjet ink contains at least a pigment, an organic solvent, water and a silicone surfactant; the pretreatment liquid contains at least water-insoluble resin particles and a pigment coagulant; and the silicone surfactant has a structure represented by the following Formula (1),

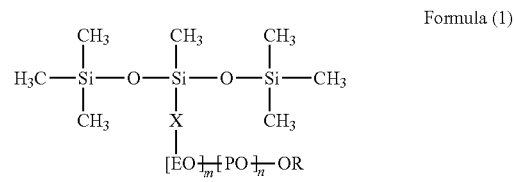

Formula (1)

in Formula (1), R represents a hydrogen atom or a hydrocarbon group having 1 to 4 carbon atoms; X is an alkylene group having 2 to 6 carbon atoms and may have a branched structure; EO represents an ethylene oxide group, PO represents a propylene oxide group, and an order of EO and PO is random; m and n represent a number of repeating unit structures, m is an integer of 2 to 50, and n is an integer of 0 to 20.

9 Claims, 1 Drawing Sheet

(51) Int. Cl.
*C09D 11/322* (2014.01)
*C09D 11/38* (2014.01)
*C09D 175/04* (2006.01)

(56) References Cited

U.S. PATENT DOCUMENTS

| | | | | |
|---|---|---|---|---|
| 2004/0063811 | A1* | 4/2004 | Horie | C09D 11/36 |
| | | | | 523/160 |
| 2010/0214352 | A1* | 8/2010 | Tsunoda | D06P 5/30 |
| | | | | 524/386 |
| 2012/0306976 | A1* | 12/2012 | Kitagawa | D06P 5/30 |
| | | | | 347/100 |
| 2013/0307899 | A1* | 11/2013 | Saito | C09C 1/56 |
| | | | | 347/21 |
| 2014/0132681 | A1* | 5/2014 | Seguchi | B41M 5/52 |
| | | | | 347/100 |
| 2017/0355868 | A1* | 12/2017 | Saiga | C09D 11/40 |
| 2018/0058002 | A1* | 3/2018 | Ohashi | B41J 3/4078 |

* cited by examiner

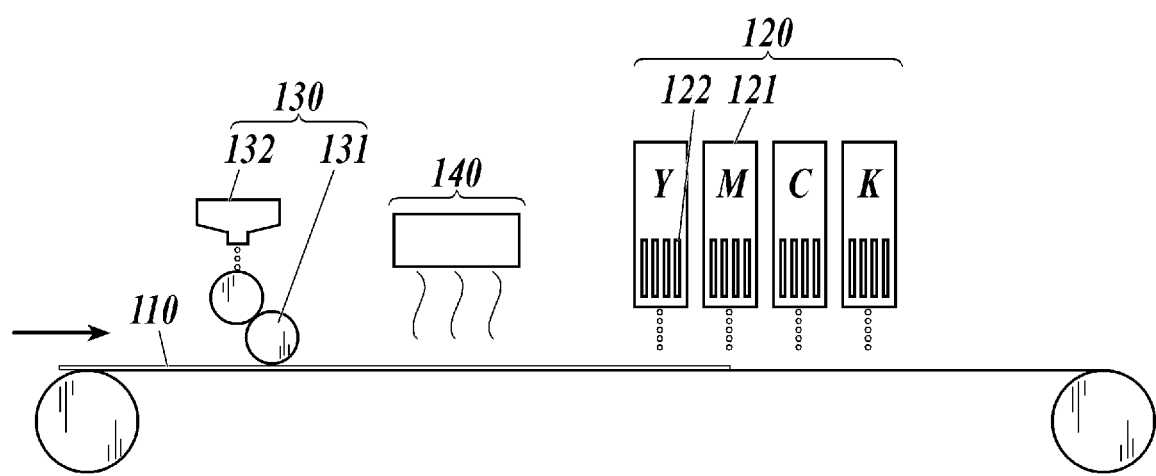

INKJET RECORDING LIQUID SET, PRINTED MATTER, AND INKJET RECORDING METHOD

CROSS-REFERENCE TO RELATED APPLICATIONS

The entire disclosure of Japanese Patent Application No. 2019-162632 filed on Sep. 6, 2019 with Japan Patent Office is incorporated herein by reference in its entirety.

BACKGROUND

Technological Field

The present invention relates to an inkjet recording liquid set, a printed matter, and an inkjet recording method. In particular, the present invention relates to an inkjet recording liquid set excellent in image quality, substrate adhesiveness and ejection stability even on a low-absorbent substrate or a non-absorbent substrate, and excellent in hot water resistance of the image surface when formed into a coating film. The present invention also relates to a printed matter and an inkjet recording method.

Description of the Related Art

In printing using an aqueous inkjet ink, after the ink has landed on a recording medium, it penetrates and is fixed to form dots, and a large number of these dots are collected to form an image. This dot formation process is important for forming a clear image. It has been proposed that by using an ink set composed of a pretreatment liquid and an image-forming ink, it is possible to improve the image quality and the fix ability with respect to white stripes and color unevenness in an image, which are particularly problematic in the image quality (for example, refer to Patent Document 1: JP-A 2017-137461). However, with the configuration of Patent Document 1, although the image quality on a low-absorbent substrate such as coated paper is satisfactory, the effect of image quality and fixability on a non-absorbent substrate typified by a film was insufficient.

Therefore, it has been proposed to improve image quality and fixability on a non-absorbent substrate by using an ink set combining a specific binder resin and an organic solvent or an ink set combining an emulsion and a specific coagulant (refer to, for example, Patent Document 2: JP-A 2015-124342; and Patent Document 3: JP-A 2018-16711). However, in the configuration having excellent fixability and image quality, a large amount of resin is added to the ink, and when a large amount of binder resin is added to the ink, ejection stability from the inkjet head is impaired and it was difficult to maintain stable image quality. In particular, when high-speed printing is assumed, it is necessary to simultaneously secure image quality on a non-absorbent recording medium, fixability on a substrate, and ejection stability that maintains stable image quality. Conventional technology could not meet all of these.

SUMMARY

The present invention has been made in view of the above problems and situations. An object of the present invention is to provide an inkjet recording liquid set excellent in image quality, substrate adhesiveness and ejection stability even on a low-absorbent substrate or a non-absorbent substrate, and excellent in hot water resistance of the image surface when formed into a coating film. An object of the present invention is also to provide a printed matter and an inkjet recording method.

The present inventors have found out the following in the process of examining the cause of the above problems in order to solve the above problems. By using an inkjet recording liquid set in which a specific surfactant is contained in an inkjet ink, and water-insoluble resin particles and a pigment coagulant are contained in a pretreatment liquid, it was found that the image quality, substrate fixing property, and ejection stability were satisfied even on a low-absorbent substrate or a non-absorbent substrate. Further surprisingly, it was found that the hot water resistance of the image surface is improved when it was formed into a coating film, which led to the present invention. That is, the above-mentioned object concerning the present invention is solved by the following means.

To achieve at least one of the abovementioned objects, an inkjet recording liquid set that reflects an aspect of the present invention is as follows.

An inkjet recording liquid set comprising at least an inkjet ink and a pretreatment liquid, wherein the inkjet ink contains at least a pigment, an organic solvent, water and a silicone surfactant; the pretreatment liquid contains at least water-insoluble resin particles and a pigment coagulate; and the silicone surfactant has a structure represented by the following Formula (1),

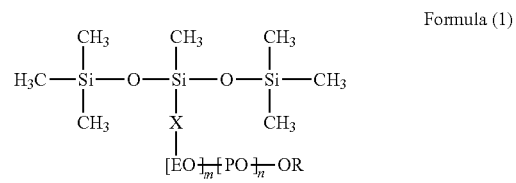

Formula (1)

In Formula (1), R represents a hydrogen atom or a hydrocarbon group having 1 to 4 carbon atoms. X is an alkylene group having 2 to 6 carbon atoms and may have a branched structure. EO represents an ethylene oxide group, PO represents a propylene oxide group, and an order of EO and PO is random. m and n represent a number of repeating unit structures, m is an integer of 2 to 50, and n is an integer of 0 to 20.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention, wherein:

The FIGURE is a schematic diagram illustrating an exemplary configuration of an image forming apparatus according to an embodiment of the present invention.

DETAILED DESCRIPTION OF THE EMBODIMENTS

Hereinafter, one or more embodiments of the present invention will be described with reference to the drawings. However, the scope of the invention is not limited to the disclosed embodiments.

The inkjet recording liquid set of the present invention is an inkjet recording liquid set containing at least an inkjet ink and a pretreatment liquid, wherein the inkjet ink contains at least a pigment, an organic solvent, water and a silicone surfactant; the treatment liquid contains at least water-insoluble resin particles and a pigment coagulant; and the silicone surfactant has a structure represented by Formula (1). This feature is a technical feature common to or corresponding to each of the following embodiments.

By the above means of the present invention, it is possible to provide an inkjet recording liquid set excellent in image quality, substrate adhesiveness, ejection stability, and the hot water resistance of the image surface when formed into a coating film even on a low-absorbent substrate or a non-absorbent substrate. It is also possible to provide a printed matter, and an inkjet recording method. The mechanism by which the effects of the present invention are expressed or the mechanism of action has not been clarified, but is presumed as follows.

Effect of Silicone Surfactant

A silicone surfactant is a surfactant having a polysiloxane skeleton, and its characteristics are derived from the structure of polysiloxane. It is generally known that the length of the main chain formed of a siloxane unit (—Si—O—) controls the ability to reduce the surface tension. That is, as the siloxane main chain becomes shorter, the compatibility in the ink is improved and the surface tension will be lowered. The silicone surfactant provided with the polysiloxane structure having the structure represented by Formula (1) in the present invention has the shortest chain unit for satisfying both of these. It is possible to effectively impart the wettability of the ink to the low-absorbent substrate or the non-absorbent substrate. In addition, when controlling the compatibility of the silicone surfactant according to the application, it is possible to organically modify the siloxane unit (—Si—O—) at the site corresponding to the side chain or terminal. When used in an aqueous ink, it is necessary to make the silicone surfactant itself highly polar, and in general, polyether modification using polyethylene oxide or polypropylene oxide is used. Since the silicone portion is hydrophobic, the polyether portion is oriented in water or the organic solvent to be contained, and the compatibility is improved. Therefore, both ejection stability and wettability will be imparted.

(Effect of Pigment Dispersant)

When high-speed printing is intended, it is required to instantaneously perform both functions of wetting and spreading of ink droplets on the film, which is a non-absorbent substrate, and temporary fixing (pinning) of dots. The silicone surfactant according to the present invention ensures wettability, and the pigment coagulant ensures the pinning function, thereby achieving compatibility. As for the pigment coagulant, since the diffusion rate into the ink is improved by using the relatively low-molecular acid or metal salt of the present invention, pinning performance suitable for high-speed printing is exhibited, resulting in obtaining good image quality.

(Water-Insoluble Resin Particles)

Polyester, polyolefin, and polyurethane resins are known to have excellent fixability on non-absorbent substrates such as PP (polypropylene) and PET (polyethylene terephthalate). However, since the resin coating film having excellent fixability to PP applied by the pretreatment liquid is generally hard to be wet with the aqueous ink, the image quality is likely to be impaired. Therefore, when combined with the silicone surfactant according to the present invention, it may be suitably spread on the resin coating film, and both image quality and fixability will be achieved. The silicone chain portion of the above-mentioned silicone surfactant is well adapted to the resin coating film, and since the ether chain is relatively short and the molecule is compact, the molecular motion of the surfactant is improved, and it spreads instantly on the resin coating film. It was further surprisingly found that the use of the silicone surfactant according to the present invention improves the hot water resistance of the image surface when formed into a coating film. This is because during the ink drying process, the silicone surfactant is oriented on the surface and the hydrophobic silicone chains are regularly arranged on the image surface, so that the final coating film surface is in a state where the silicone groups are evenly aligned without gaps. It is estimated that the compatibility between the ink film and the resin coating film was improved and the hot water resistance was developed.

As an embodiment of the present invention, it is preferable that the content of the silicone surfactant is in the range of 0.1 to 3.0 mass % with respect to the inkjet ink from the viewpoint that storage stability is excellent, and ink wettability is effectively imparted.

Further, it is preferable that the inkjet ink further contains a pigment dispersant from the viewpoint that the storage stability is excellent, and the coagulant acts effectively to improve the image quality.

In addition, it is preferable that the pigment coagulant is a polyvalent metal salt or an organic acid from the viewpoint that it has a low molecular weight, it easily diffuses into the inkjet ink, and the pigment in the inkjet ink is aggregated at a higher speed. As a result, when high-speed printing is performed, the pinning property of the inkjet ink is improved even on a low-absorbent substrate or a non-absorbent substrate, and a high-definition image is obtained.

It is preferable that the water-insoluble resin particles contain a polyurethane resin from the viewpoint that effective substrate adhesion to a non-absorbent substrate may be obtained. Further, it is preferable that the water-insoluble resin particles are composite resin particles obtained by emulsifying the polyolefin resin or the polyacrylic resin in the polyurethane resin from the viewpoint of suppressing a decrease in compatibility with the polyurethane resin and the pigment coagulant, which is different from the use of the polyolefin resin or polyacrylic resin alone.

The printed matter of the present invention is provided with a printing layer containing the inkjet ink contained in the inkjet recording liquid set, and a pretreatment layer containing the pretreatment liquid contained in the inkjet recording liquid set. As a result, it is possible to obtain a printed matter having excellent image quality, substrate adhesiveness, ejection stability and hot water resistance, even on a low-absorbent substrate or a non-absorbent substrate.

The inkjet recording method of the present invention records an image on a recording medium of a low-absorbent substrate or a non-absorbent substrate by using the inkjet recording liquid set. This provides an inkjet recording method excellent in image quality, substrate adhesiveness, ejection stability, and hot water resistance even on a low-absorbent substrate or a non-absorbent substrate.

The present invention and the constitution elements thereof, as well as configurations and embodiments, will be detailed in the following. In the present description, when two figures are used to indicate a range of value before and after "to", these figures are included in the range as a lowest limit value and an upper limit value.
[Inkjet Recording Liquid Set]

The inkjet recording liquid set of the present invention is an inkjet recording liquid set containing at least an inkjet ink and a pretreatment liquid, wherein the inkjet ink contains at least a pigment, an organic solvent, water and a silicone surfactant; the treatment liquid contains at least water-insoluble resin particles and a pigment coagulant; and the silicone surfactant has a structure represented by the following Formula (1).

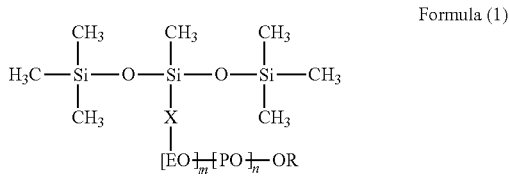

Formula (1)

In Formula (1), R represents a hydrogen atom or a hydrocarbon group having 1 to 4 carbon atoms. X is an alkylene group having 2 to 6 carbon atoms and may have a branched structure. EO represents an ethylene oxide group, PO represents a propylene oxide group, and an order of EO and PO is random. m and n represent a number of repeating unit structures, m is an integer of 2 to 50, and n is an integer of 0 to 20.

(1) Inkjet Ink

The inkjet ink according to the present invention is an aqueous inkjet ink containing at least a pigment, an organic solvent, water and the silicone surfactant.

(1.1) Silicone Surfactant

The silicone surfactant according to the present invention has a structure represented by Formula (1). In Formula (1), R is preferably a hydrogen atom, a methyl group, an ethyl group, a propyl group or a butyl group, and more preferably a hydrogen atom or a methyl group. In Formula (1), X is preferably an alkylene group having 3 carbon atoms (that is, a propylene group), m is preferably an integer of 5 to 20 and n is preferably an integer of 0 to 6. In Formula (1), [EO]m and [PO]n may be in either order. For example, X is not only bonded to EO, but X may be bonded to PO. Further, the order of EO and PO is in any order, and EO may be bonded to PO, and then EO may be bonded further.

Specific examples of the silicone surfactant having the structure represented by Formula (1) include S-1 to S-8 below, but the present invention is not limited thereto.

(S-1): In Formula (1), R=a methyl group, X=an alkylene group having 3 carbon atoms, m=9, n=0
(S-2): In Formula (1), R=a butyl group, X=an alkylene group having 3 carbon atoms, m=25, n=6
(S-3): In Formula (1), R=a hydrogen atom, X=an alkylene group having 3 carbon atoms, m=3, n=0
(S-4): In Formula (1), R=a hydrogen atom, X=an alkylene group having 3 carbon atoms, m=33, n=0
(S-5): In Formula (1), R=a hydrogen atom, X=an alkylene group having 3 carbon atoms, m=22, n=16
(S-6): In Formula (1), R=a hydrogen atom, X=an alkylene group having 3 carbon atoms, m=9, n=0.
(S-7): In Formula (1), R=a hydrogen atom, X=an alkylene group having 3 carbon atoms, m=12, n=3
(S-8): In Formula (1), R=a hydrogen atom, X=an alkylene group having 3 carbon atoms, m=1, n=0

It is preferable that the content of the silicone surfactant having the structure represented by Formula (1) is in the range of 0.1 to 3.0 mass % with respect to the entire ink from the viewpoint that the storage stability is excellent, and ink wettability is effectively imparted.

The silicone surfactant according to the present invention may be synthesized, for example, according to the synthetic examples described in Examples below.

(1.2) Organic Solvent

The organic solvent according to the present invention preferably contains an alcohol. More preferably, it contains an alcohol having 1 to 3 hydroxy groups.

Preferable examples of the mono-alcohol having one hydroxy group include methanol, ethanol, propanol, isopropanol, butanol, isobutanol, secondary butanol, and tertiary butanol. Examples of the diol having two hydroxy groups include 1,2-ethanediol (ethylene glycol), 3-oxapentane-1,5-diol (diethylene glycol), 1,2-propanediol (propylene glycol), 1,3-propanediol, 2-methyl-1,3-propanediol, 2,2-dimethyl-1,3-propanediol, 1,4-butanediol, 2-methyl-2,4-pentanediol, 3-methyl-1,5-pentanediol, and 1,6-hexanediol. Examples of the triol having three hydroxy groups include 1,2,3-propanetriol, trimethylolpropane, and trimethylolethane.

In particular, it is preferable to contain at least one of the following compounds as the organic solvent in terms of superior storage stability: 1,2-ethanediol (ethylene glycol), 3-oxapentane-1,5-diol (diethylene glycol), 1,2-propanediol (propylene glycol), 1,3-propanediol, 2-methyl-1,3-propanediol, 2,2-dimethyl-1,3-propanediol, 1,4-butanediol, 2-methyl-2,4-pentanediol, 3-methyl-1,5-pentanediol, and 1,6-hexanediol.

As the organic solvent according to the present invention, other organic solvents other than the alcohols having 1 to 3 hydroxy groups may be further used. As the other organic solvent, a water-soluble organic solvent is preferable, and for example, amines, amides, and glycol ethers may be preferably exemplified.

Preferable examples of the amine include ethanolamine, diethanolamine, triethanolamine, N-methyldiethanolamine, N-ethyldiethanolamine, morpholine, N-ethylmorpholine, ethylenediamine, diethylenediamine, triethylenetetramine, tetraethylenepentamine, polyethyleneimine, pentamethyldiethylenetriamine, and tetramethylpropylenediamine.

Preferable examples of the amide include formamide, N,N-dimethylformamide, and N, N-dimethylacetamide.

Preferable examples of the glycol ether include ethylene glycol monoethyl ether, ethylene glycol monobutyl ether, diethylene glycol monoethyl ether, diethylene glycol monobutyl ether, triethylene glycol monobutyl ether, propylene glycol monopropyl ether, dipropylene glycol monomethyl ether, and tripropylene glycol monomethyl ether.

When the inkjet ink contains two or mom kinds of organic solvents, the mass ratio of the glycols and diols with respect to the mass of the entire organic solvents is preferably 50% or mom.

Further, the content of the organic solvent according to the present invention is preferably in the range of 10 to 50 mass % with respect to the inkjet ink from the viewpoint of excellent storage stability.

(1.3) Pigment

As the pigment according to the present invention, an anionic dispersed pigment, for example, an anionic self-dispersible pigment or a pigment dispersed by an anionic polymeric dispersant may be used. In particular, a pigment dispersed by an anionic polymeric dispersant is suitable.

As the pigment, conventionally known pigments may be used without particular limitation, and, for example, organic pigments such as insoluble pigments and lake pigments, and inorganic pigments such as titanium oxide may be preferably used.

The insoluble pigment is not limited. Preferable examples of the insoluble pigment are azo, azomethine, methine, diphenylmethane, triphenylmethane, quinacridone, anthraquinone, perylene, indigo, quinophthalone, isoindolinone, isoindoline, azine, oxazine, thiazine, Dioxazine, thiazole, phthalocyanine, and diketopyrrolopyrrole pigments.

Specific organic pigments that may be preferably used include the following pigments.

Examples of a magenta or red pigment are C.I. Pigment Red 2, C.I. Pigment Red 3, C.I. Pigment Red 5, C.I. Pigment Red 6, C.I. Pigment Red 7, C.I. Pigment Red 15, C.I. Pigment Red 16, C.I. Pigment Red 48:1, C.I. Pigment Red 53:1, C.I. Pigment Red 57:1, C.I. Pigment Red 122, C.I. Pigment Red 123, C.I. Pigment Red 139, C.I. Pigment Red 144, C.I. Pigment Red 149, C.I. Pigment Red 166, C.I. Pigment Red 177, C.I. Pigment Red 178, C.I. Pigment Red 202, C.I. Pigment Red 222, and C.I. Pigment Violet 19.

Examples of an orange or yellow pigment are C.I. Pigment Orange 31, C.I. Pigment Orange 43, C.I. Pigment Yellow 12, C.I. Pigment Yellow 13, C.I. Pigment yellow 14, C.I. Pigment Yellow 15, C.I. Pigment Yellow 15:3, C.I. Pigment Yellow 17, C.I. Pigment Yellow 74, C.I. Pigment Yellow 93, C.I. Pigment Yellow 128, C.I. Pigment Yellow 94, C.I. Pigment Yellow 138, and C.I. Pigment Yellow 155. In particular, in view of the balance of color tone and light resistance, C.I. Pigment Yellow 155 is preferred.

Examples of a green or cyan pigment am C.I. Pigment Blue 15, C.I. Pigment Blue 15:2, C.I. Pigment Blue 15:3, C.I. Pigment Blue 16, C.I. Pigment Blue 60, and C.I. Pigment Green 7.

Examples of a black pigment am C.I. Pigment Black 1, C.I. Pigment Black 6, and C.I. Pigment Black 7.

(1.4) Pigment Dispersant

The inkjet ink of the present invention preferably further contain a pigment dispersant. The pigment dispersant used to disperse the pigment is not particularly limited, and it is preferably a polymer dispersant having an anionic group, and those having a molecular weight in the range of 5,000 to 200,000 may be suitably used.

Examples of the polymer dispersant am styrene, styrene derivatives, vinyl naphthalene derivatives, acrylic acid, acrylic acid derivatives, maleic acid, maleic acid derivatives, itaconic acid, itaconic acid derivatives, fumaric acid, block copolymers having a structure derived from two or more monomers selected from fumaric acid derivatives, random copolymers and salts thereof, polyoxyalkylenes, and polyoxyalkylene alkyl ethers.

The polymer dispersant preferably has an acryloyl group, and is preferably neutralized with a neutralizing base and added. The neutralizing base is not particularly limited, and it is preferably an organic base such as ammonia, monoethanolamine, diethanolamine, triethanolamine or morpholine. In particular, when the pigment is titanium oxide, the titanium oxide is preferably dispersed by a polymer dispersant having an acryloyl group.

The addition amount of the polymer dispersant is preferably in the range of 10 to 100 mass %, and more preferably in the range of 10 to 40 mass % with respect to the pigment.

It is particularly preferable that the pigment is in the form of a so-called capsule pigment, in which the pigment is coated with the above-mentioned polymeric dispersant. Various known methods may be used to coat the pigment with the polymer dispersant. For example, a phase inversion emulsification method, an acid precipitation method, or a method of dispersing a pigment with a polymerizable surfactant is performed, then, supplying a monomer thereto, and coating while polymerizing may be preferably exemplified.

Particularly preferable method is a follows: a water-insoluble resin is dissolved in an organic solvent such as methyl ethyl ketone, and the acid group in the resin is partially or completely neutralized with a base; then, a pigment and ion-exchange water is added and the mixture is dispersed; thereafter, the organic solvent is removed and water is added according to necessity.

The average particle diameter of the pigment in the inkjet ink in the dispersed state is preferably in the range of 50 to 200 m. Thereby, the dispersion stability of the pigment may be improved, and the storage stability of the ink may be improved. The particle size of the pigment may be measured by a commercially available particle size measuring instrument using a dynamic light scattering method or an electrophoresis method. The measurement by the dynamic light scattering method is simple, and the particle diameter range may be measured accurately.

The pigment may be used after being dispersed with a dispersant together with other necessary additives depending on the desired purposes.

As a dispersing machine, a ball mill, a sand mill, a line mill, and a high pressure homogenizer, which are conventionally known, may be used. Among them, dispersing the pigment by a sand mill is preferable because the particle size distribution becomes sharp. The material of the beads used for sand mill dispersion is not particularly limited, and it is preferably zirconia or zircon from the viewpoint of preventing formation of bead fragments and contamination of ionic components. Furthermore, the bead diameter is preferably in the range of 0.3 to 3 mm.

The content of the pigment in the inkjet ink is not particularly limited, and a range of 7 to 18 mass % is preferable for titanium oxide, and a range of 0.5 to 7 mass % is preferable for an organic pigment.

(1.5) Water

The water contained in the aqueous inkjet ink of the present invention is not particularly limited, and may be ion-exchanged water, distilled water, or pure water.

(1.6) Other Components

In the inkjet ink used in the present invention, various additives known in the art may be used, according to the purpose of improving the ejection stability, print head and ink cartridge compatibility, storage stability, image storability, and other various performances, as necessary. Examples of the additives are polysaccharides, viscosity modifiers, resistivity modifiers, film-forming agents, UV absorbers, antioxidants, anti-fading agents, fungicides, and anti-rust agents. They are appropriately selected and used. Specific examples are: oil droplets made of such as liquid paraffin, dioctyl phthalate, tricresyl phosphate, and silicone oil; UV absorbers described in JP-A 57-74193, JP-A 57-87988, and JP-A 62-261476; antifading agents described in JP-A 57-74192, JP-A 57-87989, JP-A 60-72785, JP-A 61-146591, JP-A 1-95091 and JP-A 3-13376; fluorescent whitening agents described in JP-A 5942993, JP-A 59-52689, JP-A 62-280069, JP-A 61-242871, and JP-A 4-219266.

(1.7) Physical Properties

The viscosity of the inkjet ink used in the present invention having the above constitution is preferably in the range of 1 to 40 mPa·s at 25° C., and more preferably in the range of 2 to 10 mPa·s.

(1.8]) Method for Producing Inkjet Ink

The method for producing an inkjet ink according to the present invention preferably comprises a step of mixing at least a pigment, an organic solvent, water and a silicone surfactant.

In the mixing step, at least the pigment, the organic solvent, water, and the silicone surfactant having the structure represented by Formula (1), and each optional component are mixed at room temperature or, if necessary, under heating. Then, it is preferable to filter the obtained mixed liquid with a predetermined filter. At this time, a dispersion containing the pigment and the pigment dispersant may be prepared in advance, and the remaining components may be added and mixed therein.

(2) Pretreatment Liquid

The pretreatment liquid according to the present invention contains at least water-insoluble resin particles and a pigment coagulant. The "pretreatment liquid (pretreatment liquid for inkjet recording)" in the present invention has a function of accelerating the image formation of ink or improving the image quality when recording an image on a substrate by an inkjet printing method. It is one type of ink that is previously applied to the substrate. Specifically, the pretreatment liquid is a liquid for fixing the ink at the position where the pretreatment liquid is applied to the recording medium so that the color ink forming the image does not spread on the recording medium.

(2.1) Pigment Coagulant

As the pigment coagulant, a polyvalent metal salt, an organic acid or a cationic polymer may be used, and a polyvalent metal salt or an organic acid is preferably used. Here, the "pigment coagulant" refers to a compound that aggregates the pigment contained in the ink.

(2.1.1) Polyvalent Metal Salt

Examples of the polyvalent metal salt include water-soluble salts such as calcium salt, magnesium salt, aluminum salt, and zinc salt. The polyvalent metal salt is capable of aggregating the anionic component (e.g., anionic resin emulsion) in the aqueous inkjet ink by salting out.

Further, the content of the polyvalent metal salt is preferably 0.5 to 8.0 mass % with respect to the total mass of the pretreatment liquid. By setting the content of the polyvalent metal salt within the above range, bleeding during high-speed printing will be suppressed.

(2.1.2) Organic Acid

Examples of the organic acid include formic acid, acetic acid, propionic acid, isobutyric acid, oxalic acid, fumaric acid, malic acid, citric acid, malonic acid, succinic acid, maleic acid, benzoic acid, 2-pyrrolidone-5-carboxylic acid, lactic acid, acrylic acid and derivatives thereof, methacrylic acid and derivatives thereof, and compounds having a carboxy group including acrylamide and derivatives thereof, sulfonic acid derivatives, phosphoric acid and derivatives thereof.

The organic acid will aggregate the pigment contained in the inkjet ink. Further, the organic acid will aggregate anionic components (e.g., anionic resin emulsion) in the aqueous inkjet ink due to pH change.

The content of the organic acid is preferably an amount that may adjust the pH of the pretreatment liquid to be less than the first dissociation constant of the organic acid (for example, 3.5 or less). The content of the organic acid is preferably 0.5 to 8.0 mass % with respect to the total mass of the pretreatment liquid. By setting the content of the organic acid within the above range, bleeding during high-speed printing may be effectively suppressed.

Since the polyvalent metal salt and the organic acid have a low molecular weight, they easily diffuse into the aqueous inkjet ink, so that the pigment in the aqueous inkjet ink will be aggregated at a higher speed. Accordingly, the inkjet ink of the present invention will improve the pinning property of the inkjet ink even on a low-absorbent substrate or a non-absorbent substrate when high-speed printing is performed, so that a high-definition image may be obtained.

(2.1.3) Cationic Polymer

Examples of the cationic polymer include diallyldimethylammonium chloride polymers, polyallylamine polymers, polyvinylamines polymers, and polyethyleneimine polymers. The cationic polymer will aggregate anionic components (such as an anionic resin emulsion) in the inkjet ink.

Further, the content of the cationic polymer is preferably 0.5 to 8.0 mass % with respect to the total mass of the pretreatment liquid. By setting the content of the cationic polymer within the above range, bleeding during high-speed printing will be suppressed.

Since the cationic polymer has a large number of cation sites in the polymer chain as repeating units, the pigment in the aqueous inkjet ink will be aggregated at a higher speed. Accordingly, the inkjet ink of the present invention will improve the pinning property of the inkjet ink even on a low-absorbent substrate or a non-absorbent substrate when high-speed printing is performed, so that a high-definition image may be obtained.

The content of the pigment coagulant may be measured by a known method. For example, when the pigment coagulant is a polyvalent metal salt, it may be measured by ICP emission spectrometry, and when the pigment coagulant is an organic acid, it may be measured by high performance liquid chromatography (HPLC). When the coagulant is a cationic polymer, it may be measured by gel permeation chromatography (GPC).

(2.2) Water-Insoluble Resin Particles

The pretreatment liquid according to the present invention contains water-insoluble resin particles. It is preferable that the pretreatment liquid contains a polyurethane resin as the water-insoluble resin particles. Further, the water-insoluble resin particles are more preferably composite resin particles obtained by emulsifying a polyolefin resin or a polyacrylic resin in a polyurethane resin. The water-insoluble resin particles used in the present invention are preferably resins that will accept an inkjet ink and have solubility or affinity for the ink.

Here, "water-insoluble resin particles" means that when the resin is dried at 105° C. for 2 hours and then dissolved in 100 g of water at 25° C., the dissolved amount is 10 g or less, preferably 5 g or less, and more preferably 1 g or less. However, when the resin has a salt-forming group, the amount of dissolution is a dissolution value when the salt-forming group of the resin is 100% neutralized with acetic acid or sodium hydroxide, depending on the type.

(2.2.1) Polyurethane Resin

As the polyurethane resin contained in the pretreatment liquid, one having a hydrophilic group may be used. Examples of the hydrophilic group include a carboxy group (—COOH) and a salt thereof, and a sulfonic acid group (—$SO_3$H) and a salt thereof. Examples of the salt include alkali metal salts such as sodium salt and potassium salt, and amine salts. Among these hydrophilic groups, a carboxy group or a salt thereof is preferable.

The polyurethane resin is preferably an aqueous dispersion in which a self-emulsifying polyurethane having a water-soluble functional group is dispersed in the molecule, or an aqueous dispersion of forced emulsification type polyurethane prepared by emulsifying with a strong mechanical shear force using a surfactant. The polyurethane resin in the aqueous dispersion is obtained by the reaction of a polyol with an organic polyisocyanate and a hydrophilic group-containing compound.

Examples of the polyol which may be used for preparation of the polyurethane resin aqueous dispersion include polyester polyol, polyether polyol, polycarbonate polyol, and polyolefin type polyol.

Examples of the polyester polyol include condensation products made of low molecular weight polyols and polycarboxylic acids. Examples of the low molecular weight polyol are ethylene glycol, diethylene glycol, triethylene glycol, 1,2-propylene glycol, 1,3-propylene glycol, neopentyl glycol, 1,3-butanediol, 1,4-butanediol, 3-methylpentanediol, hexamethylene glycol, 1,8-octanediol, 2-methyl-1, 3-propanediol, bisphenol A, hydrogenated bisphenol A, trimethylolpropane, and cyclohexane dimethanol. Examples of the polycarboxylic acid are succinic acid, glutaric acid, adipic acid, sebacic acid, phthalic acid, isophthalic acid, terephthalic acid, trimellitic acid, tetrahydrofuranic acid, endomethine tetralydrofuranic acid, and hexahydrophthalic acid.

Examples of the polyether polyol include polyethylene glycol, polypropylene glycol, polyethylene polytetrameth-ylene glycol, polypropylene polytetremethylene glycol, and polytetramethylene glycol.

Examples of the polycarbonate polyol may be obtained, for example, by the reaction of a carbonic acid derivative such as diphenyl carbonate, dimethyl carbonate or phosgene with a diol. Examples of the diol include ethylene glycol, diethylene glycol, triethylene glycol, 1,2-propylene glycol, 1,3-propylene glycol, neopentyl glycol, 1,3-butanediol, 1,4-butanediol, 3-methylpentanediol, hexamethylene glycol, 1,8-octanediol, 2-methyl-1,3-propanediol, bisphenol A, hydrogenated bisphenol A, trimethylolpropane, and cyclohexane dimethanol.

Examples of the organic polyisocyanate compound that may be used for preparation of the polyurethane resin aqueous dispersion include: aromatic isocyanates such as tolylene diisocyanate (TDI), diphenylmethane diisocyanate (MDI), polymeric (MDI), xylylene diisocyanate (XDI), and tetramethyl xylylene diisocyanate (TMXDI); aliphatic isocyanate such as hexamethylene diisocyanate (HMDI); alicyclic isocyanates such as isophorone diisocyanate (IPDI), and 4,4'-dicyclohexylmethane diisocyanate (hydrogenated MDI, H12 MDI). These may be used alone or in combination of two or more kinds.

Examples of the hydrophilic group-containing compound that may be used for preparation of the polyurethane resin aqueous dispersion include: compounds containing a carboxy group such as 2,2-dimethylol propionic acid, 2,2-dimethylol butanoic acid, 2,2-dimethylol butyric acid, 2,2-dimethylol valeric acid, and glycine, and their derivatives of sodium salts, potassium salts, and amine salts; compounds containing a sulfonic acid group such as taurine (i. e., aminoethyl sulfonic acid), and ethoxypolyethylene glycol sulfonic acid, and their derivatives of sodium salts, potassium salts, and amine salts.

The polyurethane resin may be obtained by a known method. It may be obtained as follows. At first, a urethane prepolymer is obtained by mixing a polyol, an organic polyisocyanate and a hydrophilic group-containing compound and reacting them at 30 to 130° C. for 30 minutes to 50 hours.

The obtained urethane prepolymer is extended and polymerized by a chain extender to obtain a polyurethane resin having a hydrophilic group. As a chain extender, water and/or an amine compound is preferably used. By using water or an amine as a chain extender, the isocyanate-terminated prepolymer may be efficiently elongated by reacting with a free isocyanate in a short time.

Examples of the amine as a chain extender include aliphatic polyamines such as ethylenediamine and triethylenediamine; aromatic polyamines such as meta-xylene diamine and toluylene diamine; hydrazine; and polyhydrazino compound such as adipic acid dihydrazide. The amine may contain, together with the above-mentioned polyamine, a monovalent amine such as dibutylamine or methyl ethyl ketoxime as a reaction terminator to such an extent that polymerization is not significantly inhibited.

In the synthesis of the urethane prepolymer, a solvent which is inert to isocyanate and which dissolves the urethane prepolymer may be used. Examples of the solvent include dioxane, methyl ethyl ketone, dimethylformamide, tetrahydrofuran, N-methyl-2-pyrrolidone, toluene, and propylene glycol monomethyl ether acetate. It is preferable that these hydrophilic organic solvents used in the reaction step are finally removed.

In addition, in the synthesis of the urethane prepolymer, a catalyst may be added to accelerate the reaction. Examples thereof are amine catalysts (e.g., triethylamine, N-ethylmorpholine, and triethyldiamine), tin-based catalysts (e.g., dibutyltin dilaurate and dioctyltin dilaurate), and titanium-based catalysts (e.g., tetrabutyl titanate).

The number average molecular weight of the polyurethane resin is preferably as large as possible by introducing a branched structure or an internal cross-linking structure. The number average molecular weight is preferably in the range of 50,000 to 10,000,000. When the molecular weight is in the above range, the polyurethane resin is insoluble in the solvent, a coating film having excellent weather resistance and water resistance may be obtained. The number average molecular weight (Mn) is a value measured by gel permeation chromatography (GPC). For example, by using "RID-6A" manufactured by Shimadzu Corporation (column: Tosoh Corporation "TSK-GEL", solvent: tetrahydrofuran (THF) and column temperature: 40° C.), it may be determined from a calibration curve prepared with polystyrene standard samples.

The urethane resin may be a commercially available product. Examples thereof include: "WBR-0160U" (made by Taisei Fine Chemical Co., Ltd.), "SUPERFLEX 620", "SUPERFLEX 650", "SUPERFLEX 500M" and "SUPERFLEX E-2000" (made by Dai-ichi Kogyo Seiyaku Co., Ltd., "SUPERFLEX" is a registered trademark of the same company) and "PERMARIN UC-20" (made by Sanyo Chemical Industries, Ltd., "PERMARIN" is a registered trademark made of the same company), and "PARASURF UP-22" (made by Ohara Palladium Chemical Co., Ltd.).

(2.2.2) Polyolefin Resin

Examples of the polyolefin resin contained in the pretreatment liquid include polyethylene, polypropylene, ethylene-propylene copolymer, random copolymers or block copolymers of ethylene and/or propylene with other comonomers (comonomers having 2 or more carbon atoms such as 1-butene, 1-pentene, 1-hexene, 1-heptene, 1-octene, 1-nonene, and α-olefin comonomers having 2 to 6 carbon atoms) (e.g., ethylene-propylene-butene copolymers). Moreover, the substances obtained by co-polymerization of two or more types of these other comonomers may be used. In addition, two or more of these polymers may be used by mixing.

The polyolefin resin may be a modified polyolefin such as a polyolefin modified with an unsaturated carboxylic acid and/or an acid anhydride. As the modified polyolefin, a polyolefin modified with an unsaturated carboxylic acid and/or an acid anhydride and/or a compound having one or more double bonds per molecule is preferably used.

Examples of an unsaturated carboxylic acid and an acid anhydride include α,β-unsaturated carboxylic acids and their anhydrides. Specific examples thereof are: maleic acid, maleic anhydride, fumaric acid, citraconic acid, citraconic anhydride, mesaconic acid, itaconic acid, itaconic anhydride, aconitic acid, and aconitic anhydride. These may be used alone or in combination of two or more kinds.

As the compound having one or more double bonds per one molecule, a (meth)acrylic acid ester monomer may be cited. Examples of the (meth)acrylic acid ester monomer include methyl (meth)acrylate, ethyl (meth)acrylate, propyl (meth)acrylate, butyl (meth)acrylate, 2-hydroxyethyl (meth)acrylate, 2-hydroxypropyl (meth)acrylate, 4-hydroxybutyl (meth)acrylate, cyclohexyl (meth)acrylate, tetrahydrofurfuryl (meth)acrylate, isobornyl (meth)acrylate, benzyl (meth)acrylate, 2-hydroxybutyl (meth)acrylate, benzyl (meth)acrylate, glycidyl (meth)acrylate, (meth)acrylic acid, (di) ethylene glycol di(meth)acrylate, di (meth) acrylic acid 1,4-butanediol di(meth)acrylate, 1,6-hexanediol di(meth) acrylate, trimethylolpropane tri(meth)acrylate, glycerol di(meth)acrylate, 2-ethylhexyl (meth)acrylate, lauryl (meth)acrylate, stearyl (meth)acrylate, and acrylamide. Here, (meth)acrylic acid indicates acrylic acid and methacrylic acid.

In addition to the above-described compounds having a double bond, stymne, α-methylstymne, paramethylstymne, chloromethylstymne, divinylbenzene, vinyl acetate, and vinyl ester of versatic acid may be used.

Modification of the polyolefin is carried out by dissolving the polyolefin once in an organic solvent such as toluene or xylene, and in the presence of a radical generator, by reacting α,β-unsaturated carboxylic acid and/or its acid anhydride and/or a compound having one or mom double bonds per molecule. Alternatively, in an autoclave which may be reacted in a molten state capable of raising the temperature to the softening temperature or melting point of the polyolefin or higher, or in a uniaxial or biaxial multiaxial extruder, in the presence or absence of a radical generator, modification may be carried out by reacting α,β-unsaturated carboxylic acid and/or its acid anhydride and/or a compound having one or more double bonds per molecule.

Examples of the radical generator used in the reaction for obtaining the modified polyolefin include: peroxides such as di-tert-butyl perphthalate, tert-butyl hydroperoxide, dicumyl peroxide, benzoyl peroxide, tert-butyl peroxybenzoate, tert-butyl peroxyethyl hexanoate, tert-butyl peroxypivalate, methyl ethyl ketone peroxide, and di-tert-butyl peroxide; and azonitrile compounds such as azobisisobutyronitrile and azobisisopropionitrile. When graft copolymerization is carried out using these peroxides, the amount of peroxide is preferably in the range of 0.1 to 50 parts by mass, particularly preferably in the range of 0.5 to 30 parts by mass with respect to 100 parts by mass of the polyolefin.

The polyolefin resin may be manufactured by a publicly known method, and there is no limitation in particular about each manufacturing method or modification degree.

The polyolefin resin used in the present invention preferably has a weight average molecular weight (Mw) in the range of 20,000 to 100,000. When the weight average molecular weight (Mw) of the polyolefin resin is 20,000 or more, the cohesive force of the image formed on the low-absorbent substrate or non-absorbent substrate (coating film) becomes strong, the adhesiveness of the coating film will be improved. When the weight average molecular weight (Mw) is 100,000 or less, the solubility with respect to the organic solvent is good, and particle size reduction of the emulsified dispersion is accelerated. The weight average molecular weight (Mw) is a value measured by gel permeation chromatography (GPC). For example, by using "RID-6A" manufactured by Shimadzu Corporation (column Tosoh Corporation "TSK-GEL", solvent: tetrahydrofuran (THF) and column temperature: 40° C.), it may be determined from a calibration curve prepared with polystyrene standard samples.

A commercially available product may be used as the polyolefin resin. Examples of the commercially available product include "ARROWBASE SB-1200" (made by Unitika Ltd., "ARROWBASE" is a registered trademark of the same company), "AUROREN 150A" and "AUROREN AE-301" (made by Nippon Paper Industries Co., Ltd., "AUROREN" is a registered trademark of the same company), "SUPERCHLON E415" (made by Nippon Paper Industries Co., Ltd., "SUPERCHLON" is a registered trademark of the same company), and "HARDLEN Na-1001" (made by Toyo Kasei Co., Ltd., "HARDLEN" is a registered trademark of the same company).

(2.2.3) Polyacrylic Resin

In the present invention, a polyacrylic resin may be used as the water-insoluble resin particles. The polyacrylic resin may be obtained by using a copolymer with an acrylic acid ester component, a methacrylic acid ester component, or a styrene component.

Examples of the acrylic acid ester component and the methacrylic acid ester component include methyl (meth)acrylate, ethyl (meth)acrylate, propyl (meth)acrylate, butyl (meth)acrylate, 2-hydroxyethyl (meth)acrylate, 2-hydroxypropyl (meth)acrylate, 4-hydroxybutyl (meth)acrylate, cyclohexyl (meth)acrylate, tetrahydrofurfuryl (meth)acrylate, isobornyl (meth)acrylate, benzyl (meth)acrylate, 2-hydroxybutyl (meth)acrylate, benzyl (meth)acrylate, glycidyl (meth)acrylate, (meth)acrylic acid, (di)ethylene glycol di(meth)acrylate, 1,4-butanediol di(meth)acrylate, 1,6-hexanediol di(meth)acrylate, trimethylolpropane tri(meth)acrylate, glycerol di(meth)acrylate, 2-ethylhexyl (meth)acrylate, lauryl (meth)acrylate, stearyl (meth)acrylate, and acrylamide.

Examples of the styrene component include styrene, 4-methylstymne, 4-hydroxystymne, 4-acetoxystymne, 4-acetylstymne and styrmnesulfonic acid. These components may be used alone or in combination of two or mom kinds.

The number average molecular weight (Mn) of the polyacrylic resin is preferably 1,000 to 50,000, mom preferably 2,000 to 20,000. When the number average molecular weight (Mn) of the polyacrylic resin is 1,000 or more, the cohesive force of the coating film becomes strong and the adhesiveness is improved, and when it is 50,000 or less, the solubility in an organic solvent is good, and particle size reduction of the emulsion dispersion is accelerated. The number average molecular weight (Mn) is a value measured by gel permeation chromatography (GPC). For example, by using "RID-6A" manufactured by Shimadzu Corporation (column: Tosoh Corporation "TSK-GEL", solvent: tetrahydrofuran (THF) and column temperature: 40° C.), it may be determined from a calibration curve prepared with polystyrene standard samples.

A commercially available product may be used as the polyacrylic resin. Examples of the commercially product of the polyacrylic resin include acrylic emulsions such as DELPET 60N, 80N (made by Asahi Kasei Corporation, "DELPET" is a registered trademark of the same company), DIANAL BR52, BR80, BR83, BR85, BR88 (made by Mitsubishi Chemical Corporation, "DIANAL" is a registered trademark of the same company), KT75 (made by Denka Co., Ltd.), and VINYBLAN 2680, 2682, 2688, 2685 (made by Nissin Chemical Industry Co., Ltd., "VINIBLAN" is a registered trademark of the same company).

(2.2.4) Polyester Resin

In the present invention, a polyester resin may be used as a water-insoluble resin particle. The polyester resin is obtained by using a polyhydric alcohol component and a polycarboxylic acid component such as polycarboxylic acid, polycarboxylic acid anhydride, and polycarboxylic acid ester.

Examples of the polyhydric alcohol component include: divalent alcohols (diols) such as alkylene glycols having 2 to 36 carbon atoms (ethylene glycol, 1,2-propylene glycol, 1,3-propylene glycol, 14-butlene glycol, and 1,6-hexanediol), alkylene ether glycols having 4 to 36 carbon atoms (diethylene glycol, triethylene glycol, dipropylene glycol, polyethylene glycol, polypropylene glycol, and polybutylene glycol), alicyclic diols having 6 to 36 carbon atoms (1,4-cyclohexanedimethanol and hydrogenated bisphenol A), adducts of the alicyclic diols with alkylene oxide having 2 to 4 carbon atoms (ethylene oxide (abbreviated as EO), propylene oxide (PO), and butylene oxide (BO)) (adduct mole number 1 to 30), adducts of bisphenols (bisphenol A, bisphenol F, and bisphenol S) with alkylene oxide having 2 to 4 carbon atoms (EO, PO, and BO) (adduct mole number 2 to 30). These may be used alone or in combination of two or more kinds.

Examples of the polycarboxylic acid component include: divalent carboxylic acid (dicarboxylic acid) such as alkanedicarboxylic acids having 4 to 36 carbon atoms (succinic acid, apidic acid, and sebacic acid), alkenyl succinic acids (e.g., dodecenyl succinic acid), alicyclic dicarboxylic acids having 4 to 36 carbon atoms (dimer acid (e.g., dimerized linoleic acid), alkene dicarboxylic acids having 4 to 36 carbon atoms (maleic acid, fumaric acid, citraconic acid, and mesaconic acid), and aromatic dicarboxylic acids having 8 to 36 carbon atoms (phthalic acid, isophthalic acid, terephthalic acid or derivatives thereof, and naphthalene dicarboxylic acid). These may be used alone or in combination of two or more kinds.

The number average molecular weight (Mn) of the polyester resin is preferably in the range of 1,000 to 50,000, and more preferably in the range of 2,000 to 20,000. When the number average molecular weight (Mn) of the polyester resin is 1,000 or more, the cohesive force of the coating film becomes strong and the adhesiveness is improved, and when it is 50,000 or less, the solubility in an organic solvent is good and particle size reduction of the emulsion dispersion is accelerated. The number average molecular weight (Mn) is a value measured by gel permeation chromatography (GPC). For example, by using "RID-6A" manufactured by Shimadzu Corporation (column: Tosoh Corporation "TSK-GEL", solvent: tetrahydrofuran (TMF) and column temperature: 40° C.), it may be determined from a calibration curve prepared with polystyrene standard samples.

A commercially available product may be used as the polyester resin. Examples of the commercially product of the polyester resin include Elitel KA-5034, Elitel KA-5071S, Elitel KA-1449, Elitel KA-0134, Elitel KA-3556, Elitel KA-6137, Elitel KZA-6034, Elitel KT-8803, Elitel KT-8701, Elitel KT-9204, Elitel KT-8904, Elitel KT-0507, and Elitel KT-9511. These may be used alone or in combination of two or more kinds. The above-described commercial products are produced by Unitika Ltd., and "Elitel" is a registered trademark of the same company.

(2.2.5) Composite Resin

The composite resin that may be contained in the pretreatment liquid is preferably composite resin particles obtained by emulsifying a polyolefin resin or a polyacrylic resin in a polyurethane resin. That is, it is preferable that the composite resin particles have an inner layer made of a polyolefin resin or a polyacrylic resin, and a surface layer made of a polyurethane resin.

Here, the polyurethane resin exists at the interface between the polyolefin resin or the polyacrylic resin as the water-insoluble resin and water as the continuous phase, and functions as a water-insoluble resin particle layer different from the resin for protecting the water-insoluble resin particles. By using particles of a composite resin obtained by emulsifying a polyolefin resin or polyacrylic resin in a polyurethane resin in this way, unlike the use of the polyolefin resin or polyacrylic resin alone, it is possible to suppress a decrease in compatibility with the polyurethane resin or pigment coagulant. In addition, the physical properties of the image (coating film) may be improved and the stability of the pretreatment liquid may be improved as compared with the case where the polyolefin resin or polyacrylic resin and the polyurethane resin are respectively emulsified and mixed.

In the particles of the composite resin obtained by emulsifying the polyolefin resin in the polyurethane resin, the value of the mass ratio (U/O) of the polyurethane resin (U) and the polyolefin resin (O) is preferably in the range of 40/60 to 95/5. When the presence ratio of the polyurethane resin (U) is within the above range, the compatibility with the dispersant is improved, and the solvent resistance is also improved. Further, when the presence ratio of the polyolefin resin (O) is in the above range, the adhesion to the polyolefin film is excellent. In the above-mentioned existence ratio, the value of the mass ratio (U/O) of the polyurethane resin (U) and the polyolefin resin (O) is preferably 40/60 to 80/20.

The total resin concentration of the polyolefin resin and the polyurethane resin in the composite resin particles is not particularly limited, but is usually 5.0 mass % or more, preferably in the range of 10.0 to 70.0 mass %. When the resin concentration is within the above range, the fixing property between the substrate and the ink becomes good.

In the particles of the composite resin obtained by emulsifying the polyacrylic resin in the polyurethane resin, the value of the mass ratio (U/A) of the polyurethane resin (U) and the polyacrylic resin (A) is preferably in the range of 40/60 to 95/5. When the presence ratio of the polyurethane resin (U) is within the above range, the compatibility with the dispersant is improved, and the solvent resistance is also improved. Further, when the presence ratio of the polyacrylic resin (A) is in the above range, the adhesion to the polyolefin film is excellent. In the above-mentioned existence ratio, the value of the mass ratio (U/A) of the polyurethane resin (U) and the polyacrylic resin (A) is preferably 40/60 to 80/20.

The total resin concentration of the polyacrylic resin and the polyurethane resin in the composite resin particles is not particularly limited, but is usually 5.0 mass % or more, preferably in the range of 10.0 to 70.0 mass %. When the resin concentration is within the above range, the fixing property between the substrate and the ink becomes good.

Further, in the emulsification of the polyolefin resin or the polyacrylic resin with the polyurethane resin, a surfactant acting as an emulsifier may be used together with the polyurethane resin. Here, the storage stability of the particles of the composite resin may be improved by adding an emulsifier.

An anionic surfactant and a nonionic surfactant may be used as the emulsifier. In the present invention, it is preferable to use either one of the anionic surfactant and the nonionic surfactant, and it is more preferable to use both of them. Here, the total amount of the anionic surfactant and nonionic surfactant blended is preferably 1.0 to 20.0 parts by mass with respect to 100 parts by mass of the total resin. Further, by setting the total amount of the anionic surfactant and the nonionic surfactant to be 20.0 parts by mass or less, water resistance and solvent resistance may be improved.

The value of the blending mass ratio (X/Y) of the anionic surfactant (X) to the nonionic surfactant (Y) is preferably in the range of 100/0 to 50/50. By making the blending quantity of an anionic surfactant in this range, emulsifying ability and storage stability may be further improved.

Examples of the anionic surfactant that may be used for emulsification include alkyl sulfate, polyoxyethylene alkyl ether sulfate, sulfosuccinate, alpha olefin sulfonate, N-acyl amino acid salt, carboxylate, and phosphoric acid ester. Among these, sulfosuccinate and alpha olefin sulfonate are favorable. The type of salt is not particularly limited, but a metal salt such as a sodium salt, a potassium salt, a magnesium salt, or a triethanolamine salt, is preferable.

Examples of the nonionic surfactant that may be used for emulsification include polyoxyethylene alkyl ethers, polyoxyethylene alkylphenyl ethers, polyoxyethylene alkylamine ethers, polyoxyethylene fatty acid esters, sorbitan fatty acid esters, and sucrose fatty acid esters. Among these, polyoxyethylenealkyl ethers and polyoxyethylenealkylphenyl ethers are preferable.

The average particle diameter of the particles of the composite resin described above is not particularly limited, but is preferably 10 to 500 nm, mom preferably 10 to 300 nm, and further preferably 10 to 200 nm. The average particle diameter may be measured by a commercially available particle size measuring device using a dynamic light scattering method or an electrophoretic method. The measurement by the dynamic light scattering method is simple, and the particle diameter region may be measured accurately.

By using particles of a composite resin obtained by emulsifying a polyolefin resin or a polyacrylic resin in a polyurethane resin, the fixability of an image (coating film) on a low-absorbent substrate or a non-absorbent substrate may be improved.

The particles of the composite resin described above may be those obtained by the methods (I) and (II) for producing particles of a composite resin using a polyolefin and a polyurethane resin, which will be described later. It may be one obtained by the method (III) or (IV) for producing particles of a composite resin using a polyacrylic resin and a polyurethane resin.

In the pretreatment liquid according to the present invention, an antioxidant, a light-resistant agent, a plasticizer, a foaming agent, a thickener, a colorant, a flame retardant, other water-insoluble resin particles and various fillers may be added.

Further, various crosslinking agents such as epoxy type, carbodiimide type, oxazolidine type, blocked isocyanate type, and isocyanate type may be added to the pretreatment liquid according to the present invention in order to impart higher durability.

(2.3) Method for Producing Composite Resin Particles

The method for producing the composite resin particles according to the present invention will be described.

The composite resin particles described above may be prepared by the following preparation method (I) to (IV).

(2.3.1) Preparation Method (I)

The preparation method (I) is a method in which a polyolefin resin is emulsified in water with a urethane prepolymer having a hydrophilic group, and then an amine as a chain extender or an aqueous solution thereof is added to chain-extend the urethane prepolymer (to obtain a high molecular weight compound).

In preparation method (I), first, a resin solution obtained by dissolving a polyolefin resin in a solvent and a solution of a urethane prepolymer having a hydrophilic group are mixed, and water is added to the mixture and stirred to emulsify the mixture.

Examples of the solvent include organic solvents such as hexane, isohexane, pentane, cyclohexane, methylcyclohexane, heptane, isooctane, methyl ethyl ketone, xylene, toluene and benzene, and solvents other than water such as carbon dioxide in a supercritical state. These may be used alone or in combination of two or more kinds.

The emulsification method may be any known method such as forced emulsification method, phase inversion emulsification method, D-phase emulsification method, and gel emulsification method. The equipment used may be, for example, single stirring with a stirring blade, a disper, and a homogenizer. It is also possible to use combined stirring combining these, a sand mill, or a multi-screw extruder. In addition, the above-mentioned surfactant may be mixed together with the urethane prepolymer during the emulsification.

Then, after diluting the above-mentioned emulsion with water, an amine as a chain extender is added, and the remaining isocyanate group of the urethane prepolymer is crosslinked by the chain extender, and the polyurethane resin is polymerized. Thereafter, by distilling off the organic solvent, a composite resin particle dispersion (that is, a dispersion in which water-insoluble resin particles are dispersed) containing a polyolefin resin inside the polyurethane resin is obtained.

In the composite resin particle dispersion thus obtained, when the polyolefin resin is a modified polyolefin, the acid component introduced into the polymer may be neutralized by adding a basic substance. By ionizing the same portion by neutralization, the composite resin particle dispersion may further increase the stability because the polymer molecules am elongated and the entire system causes a viscosity increase. In this case, the desired pH may be adjusted by the addition amount of the basic substance.

The basic substance to be used is not particularly limited as long as it can neutralize the acid moiety in the polyolefin resin. Examples of the basic substance that may be used in the present invention include: organic basic substances such as methylamine, ethylamine, propylamine, butylamine, hexylamine, octylamine, ethanolamine, propanolamine, dimethylamine, diethylamine, dipropylamine, dipropylamine, dibutylamine, dihexylamine, dioctylamine, diethanolamine, dipropanolamine, N-methyldiethanolamine, triethylamine, N,N-dimethylethanolamine, 2-dimethylamino-2-methyl-1-propanol, 2-amine-2-methyl-1-propanol, and morpholine; and inorganic basic substance such as an aqueous ammonia solution, sodium hydroxide, potassium hydroxide, sodium carbonate, sodium hydrogencarbonate, ammonium carbonate, and potassium carbonate. When these basic substances am used, the purpose of the present invention may often be achieved mom effectively by using two or more types of basic substances in combination. In addition, when an amine is used as a basic substance, a tertiary amine is used so that it may not react with free isocyanate as what is added before making a urethane prepolymer chain-extend. On the other hand, when neutralizing modified polyolefin after chain extension, any of primary, secondary and tertiary amines may be used.

The amount of the basic substance used for neutralization varies depending on the degree of modification of the modified polyolefin, and it is preferably in the range of 0.1 to 10.0 parts by mass with respect to 100.0 parts by mass of the modified polyolefin. When the amount of the basic substance is 0.1 parts by mass or more, the pH becomes neutral, and as a result, the storage stability of the composite resin particle dispersion is improved. On the other hand, when the amount of the basic substance is 10.0 parts by mass or less, the storage stability of the composite resin particle dispersion is good, the basicity is not strong, and a large amount of hydrophilic substance is not introduced into the image (coating film). Thereby, water resistance is improved.

(2.3.2) Preparation Method (II)

The preparation method (II) will be described. In the preparation method (II), a urethane prepolymer having a hydrophilic group is emulsified in water, and an amine compound as a chain extender or an aqueous solution thereof is added to extend the chain of the urethane prepolymer to form an aqueous dispersion of a polyurethane resin. It is a method of preparing and emulsifying a polyolefin resin with an aqueous dispersion of a polyurethane resin.

In the preparation method (II), water is added to a solution of a urethane prepolymer having a hydrophilic group to emulsify. Then, an amine compound as a chain extender is added to the obtained emulsion, and the residual isocyanate groups of the urethane prepolymer am crosslinked with the chain extender to prepare an aqueous dispersion of a high molecular weight polyurethane resin.

Thereafter, a resin solution obtained by dissolving a polyolefin resin in a solvent and the aqueous dispersion of the polyurethane resin having a hydrophilic group obtained above am mixed. Thereby, the polyolefin resin is emulsified in the polyurethane resin having the hydrophilic group. Then, after diluting with water, the organic solvent is distilled off to obtain a composite resin particle dispersion (that is, a dispersion in which water-insoluble resin particles are dispersed) containing a polyolefin resin in the inside of the polyurethane resin.

In the preparation method (II), the same solvent as in the preparation method (I) may be selected. Further, also with respect to the emulsification method, the same method as the preparation method (I) may be used.

The average particle diameter of the composite resin particles is not particularly limited, but it is preferably in the range of 10 to 500 nm, more preferably in the range of 10 to 300 nm, and still more preferably in the range of 10 to 200 nm. The average particle size may be measured by a commercially available particle size measuring instrument using a dynamic light scattering method or an electrophoresis method. Among the above-mentioned measuring methods, the dynamic light scattering method is preferable because the measurement is simple and the particle size region may be measured with high accuracy.

These resins may be copolymers using other monomers.

(2.3.3) Preparation Method (III)

In the preparation method (III), a polyacrylic resin is emulsified in water with a urethane prepolymer having a hydrophilic group, then, an amine compound as a chain extender or an aqueous solution thereof is added, and the urethane prepolymer is subjected to chain extension (high molecular weight).

In the preparation method (III), first, a resin solution obtained by dissolving a polyacrylic resin in a solvent is mixed with a solution of a urethane prepolymer having a hydrophilic group, then water is added to the mixture, and the mixture is stirred to obtain an emulsion.

Examples of the solvent include organic solvents such as hexane, isohexane, pentane, cyclohexane, methylcyclohexane, heptane, isooctane, methyl ethyl ketone, xylene, toluene and benzene, and solvents other than water such as carbon dioxide in a supercritical state. These may be used alone or in combination of two or more kinds.

The emulsification method may be any known method such as forced emulsification method, phase inversion emulsification method, D-phase emulsification method, and gel emulsification method. The equipment used may be, for example, single stirring with a stirring blade, a disper, and a homogenizer. It is also possible to use combined stirring combining these, a sand mill, or a multi-screw extruder. In addition, the above-mentioned surfactant may be mixed together with the urethane prepolymer during the emulsification.

Then, after diluting the above-mentioned emulsion with water, an amine as a chain extender is added, and the remaining isocyanate group of the urethane prepolymer is crosslinked by the chain extender, and the polyurethane resin is polymerized. Thereafter, by distilling off the organic solvent, a composite resin particle dispersion (that is, a dispersion in which water-insoluble resin particles are dispersed) containing a polyolefin resin inside the polyurethane resin is obtained.

(2.3.4) Preparation Method (IV)

The preparation method (IV) will be described. In the preparation method (IV), a urethane prepolymer having a hydrophilic group is emulsified in water, and an amine compound as a chain extender or an aqueous solution thereof is added to extend the chain of the urethane prepolymer to obtain an aqueous dispersion of a polyurethane resin. It is a method of preparing and emulsifying a polyacrylic resin with an aqueous dispersion of a polyurethane resin.

In the preparation method (IV), water is added to a solution of a urethane prepolymer having a hydrophilic group to emulsify. Then an amine compound as a chain extender is added to the obtained emulsion, and the residual isocyanate groups of the urethane prepolymer are crosslinked with the chain extender to prepare an aqueous dispersion of a high molecular weight polyurethane resin.

Thereafter, a resin solution obtained by dissolving a polyacrylic resin in a solvent, and an aqueous dispersion of the polyurethane resin having the hydrophilic group are mixed. Thereby, a polyacrylic resin is emulsified with a polyurethane resin having a hydrophilic group. After diluting with water, and by distilling off the organic solvent, it is possible to obtain a particle dispersion of a composite resin (dispersion of water-insoluble resin particles) containing a polyacrylic resin inside a polyurethane resin.

In the preparation method (IV), the same solvent as in the preparation method (III) may be selected. Further, also with respect to the emulsification method, the same method as the preparation method (III) may be used.

The average particle diameter of the composite resin particles is not particularly limited, but it is preferably in the range of 10 to 500 nm, more preferably in the range of 10 to 300 nm, and still more preferably in the range of 10 to 200 nm. The average particle size may be measured by a commercially available particle size measuring instrument using a dynamic light scattering method or an electrophoresis method. Among the above-mentioned measuring methods, the dynamic light scattering method is preferable because the measurement is simple and the particle size region may be measured with high accuracy.

These resins may be copolymers using other monomers.

The weight average molecular weight of the particles of the composite resin is preferably in the range of 10,000 to 1,000,000. When the weight average molecular weight (Mw) of the particles of the composite resin is 10,000 or more, the cohesive force of the image formed on the low-absorbent substrate or non-absorbent substrate (coating film) becomes strong, and the adhesiveness of the coating film is improved. When the weight average molecular weight (Mw) is 1,000,000 or less, the solubility with respect to the organic solvent is good, and particle size reduction of the emulsified dispersion is accelerated. The weight average molecular weight (Mw) is a value measured by gel permeation chromatography (GPC. For example, by using "RID-6A" manufactured by Shimadzu Corporation (column: Tosoh Corporation "TSK-GEL", solvent: tetrahydrofuran (THF) and column temperature: 40° C.), it may be determined from a calibration curve prepared with polystyrene standard samples.

Although the method for preparing particles of the composite resin has been described as the water-insoluble resin particles, the present invention is not limited to this, and a commercially available composite resin may be used. An example thereof is a commercially available urethane acrylic resin "WEM-202U" (made by Taisei Fine Chemical Co., Ltd.).

(2.4) Solvent

The pretreatment liquid may contain an organic solvent as a solvent. The organic solvent may be selected from the group consisting of glycols, mono-alcohols and alkanediols described above. The organic solvents mentioned above may be used alone or in combination of two or more kinds. The solvent may be removed by the subsequent pretreatment liquid drying step.

(2.5) Surfactant

The pretreatment liquid may further contain a surfactant. As the surfactant, in addition to the surfactant represented by Formula (1), "OLFIN E1010" made by Nissin Chemical Industry Co., Ltd. ("OLFIN" is a registered trademark of the same company), "ECOSURF EH-6" and "TERGITOL TMN-6" made by Dow Chemical Co., Ltd., "BYK-333" made by BYK-Chemie ("BYK" is a registered trademark of the same company) may be used. By adding a surfactant to the pretreatment liquid, compatibility with various applying methods may be enhanced.

(2.6) Water and Other Ingredients

The pretreatment liquid may further contain a cross-linking agent, a fungicide, and a bactericide as long as the effects of the present invention are not impaired. The water contained in the pretreatment liquid is not particularly limited, and may be ion-exchanged water, distilled water, or pure water.

(3) Substrate

As the substrate according to the present invention, it is preferable to use a low-absorbent substrate or a non-absorbent substrate as a recording medium. In the present invention, the recording medium of the low-absorption substrate or the non-absorbent substrate is defined based on the measurement result of the wettability of the surface of the recording medium to water shown below.

That is, 0.5 µL of water droplet is dropped on the recording surface of the recording medium, and the decrease rate of the contact angle (comparison between the contact angle at 0.5 milliseconds after landing and the contact angle at 5 seconds) is measured. Absorption performance is characterized by this. More specifically, a recording medium having a non-absorbent substrate as a property of the recording medium is a recording medium having a characteristic that the reduction rate of the contact angle is less than 1.0%. The recording medium having a low absorbent substrate is a recording medium having the characteristics that the reduction rate of the contact angle is 1.0% or more and less than 5.0%. Further, the absorbent substrate is defined as a recording medium having a reduction rate of the contact angle of 5.0% or mom. The contact angle may be measured using a portable contact angle meter "PCA-1" (manufactured by Kyowa Interface Science Co., Ltd.).

In the present invention, a film may be used as the recording medium.

Examples of such films include known plastic films. Specific examples of the plastic film described above include a polyethylene temphthalate (PET) film, a polyethylene (PE) film, a polypropylene (PP) film, a nylon (NY) film, a polystyrene (PS) film, an ethylene-vinyl acetate copolymer (EVA) film, a polyvinyl chloride (PVC) film, a polyvinyl alcohol (PVA) film, a polyacrylic acid (PAA) film, a polycarbonate film, a polyacrylonitrile film, and a biodegradable film such as a polylactic acid film.

In order to impart a gas barrier property, a moisture proof property, and an odor retention property, the film may be coated with polyvinylidene chloride on a single surface or on both surfaces of the film, and the film may be vapor-deposited with metal oxide. In addition, the film may be subjected to antifogging treatment. In addition, the film may be subjected to corona discharge and ozone treatment.

The film may be either an un-stretched film or a stretched film. The film may also be a multi-layered substrate in which a layer such as PVA coat is provided on the surface of an absorbent substrate such as paper to make the area to be recorded non-absorbent.

(4) Printed Matter

The printed matter of the present invention is provided with a printing layer containing the inkjet ink contained in the inkjet recording liquid set and a pretreatment layer containing the pretreatment liquid.

In the printed matter of the present invention, the pretreatment liquid is ejected from an inkjet head on a substrate to form a pretreatment layer, and the inkjet ink is ejected from the inkjet head to a position where the pretreatment layer is applied and fixed to form a printing layer.

Further, another functional layer may be formed between the substrate and the pretreatment layer, and a non-absorbent film substrate may be attached to the upper layer of the printing layer via a laminate adhesive layer, for example.

(5) Inkjet Recording Method

The inkjet recording method of the present invention is characterized in that an image is recorded on a low-absorbent substrate or a non-absorbent substrate by using the inkjet recording liquid set. Specifically, the inkjet recording method of the present invention contains the following steps: a pretreatment liquid applying step of applying the above-mentioned pretreatment liquid onto a recording medium (for example, the above-mentioned film) of a low-absorbent substrate or a non-absorbent substrate; a pretreatment liquid drying step of forming a pretreatment layer by drying the pretreatment liquid applied on the low-absorbent substrate or the non-absorbent substrate; an ink applying step of applying the above-mentioned inkjet ink by an inkjet method on the above pretreatment layer, and an ink drying step of forming a printing layer by drying the ink applied on the pretreatment layer.

(5.1) Pretreatment Liquid Applying Step

In the step of applying the pretreatment liquid, the above-mentioned pretreatment liquid is applied onto the recording medium of the low-absorbent substrate or the non-absorbent substrate.

The method of applying the pretreatment liquid onto the recording medium of the low-absorbent substrate or the non-absorbent substrate is not particularly limited, but preferable examples thereof include a roller coating method, a curtain coating method, a spray coating method, and an inkjet method. Among them, the roller coating method is preferable since it may be used by connecting a roller coating machine to an inkjet recording apparatus and may be efficiently applied even when the viscosity is relatively high.

(5.2) Pretreatment Liquid Drying Step

The pretreatment liquid drying step is a step of forming a pretreatment layer by drying the pretreatment liquid applied on the recording medium of the low-absorbent substrate or the non-absorbent substrate.

The drying of the pretreatment liquid is preferably performed under the condition that the resin particles contained in the pretreatment liquid are not completely fused while removing the solvent components such as water and water-soluble organic solvent. The drying temperature of the pretreatment liquid is preferably in the range of 50 to 100° C., for example. The drying time of the pretreatment liquid is preferably in the range of 3 to 30 seconds, for example.

The pretreatment liquid may be dried, for example, using a non-contact heating type drying device such as a drying furnace or a hot air blower, or a contact heating type drying device such as a hot plate or a heat roller.

The drying temperature may be obtained by measuring any one of the following during the entire period of drying the pretreatment liquid: (a) in the case of using a non-contact heating type drying device such as a drying oven or a hot air blower, an ambient temperature such as a temperature inside the oven or a hot air temperature; (b) in the case of using a contact heating type drying device such as a hot plate or a heat roller, the temperature of the contact heating part; and (c) the surface temperature of the surface to be dried. As the measurement location, it is more preferable to measure (c) the surface temperature of the surface to be dried.

The thickness of the obtained pretreatment layer is preferably in the range of 0.3 to 3.0 μm, and more preferably the thickness of the pretreatment layer is in the range of 0.5 to 2 μm. When the thickness of the pretreatment layer is 0.3 μm or more, it is easy to enhance image adhesion and laminate strength while suppressing ink bleeding. When the thickness of the pretreatment layer is 3.0 μm or less, the deformation stress due to moisture or heat may be reduced, so that the adhesiveness of images and the laminating strength are less likely to be impaired.

(5.3) Ink Application Step

In the ink application step, the inkjet ink of the above-described inkjet recording liquid set is applied by an inkjet method onto a recording medium having a low-absorbent substrate or a non-absorbent substrate.

The inkjet method is not particularly limited, and a printer including an inkjet head loaded with an ink may be used. Specifically, an ink may be ejected as droplets from a nozzle of an inkjet head based on a digital signal, and the droplets may be landed on a pretreatment layer of a film substrate to perform printing.

The inkjet head that is used in the inkjet printing method for the present invention may be an on-demand system or a continuous system. Further, as a discharge method, any discharge method such as an electro-mechanical conversion method (for example, single cavity type, double cavity type, bender type, piston type, shear mode type, and shared wall type), or an electro-thermal conversion method (for example, thermal inkjet, and a bubble jet (registered trademark)) may be used.

Among the above-described inkjet heads, it is preferable to use an inkjet head (also referred to as a piezo inkjet head) employing a piezoelectric element as the electro-mechanical conversion element used in the electro-mechanical conversion system.

Further, the inkjet head may be either a scan type or a line type, but a line type is preferable.

The line head type inkjet head refers to an inkjet head having a length equal to or greater than the width of the printing area. As the line head type inkjet head, one head may be used that is equal to or more than the width of the printing range, or a plurality of heads may be combined to be equal to or more than the width of the printing range.

Further, it is also preferable to arrange a plurality of heads side by side so that the nozzles of each other am arranged in a staggered arrangement to increase the resolution of the heads as a whole.

The conveying speed of the recording medium of a low-absorbent substrate or a non-absorbent substrate may be set, for example, in the range of 1 to 120 m/min. The faster the conveying speed, the faster the image forming speed. According to the present invention, the occurrence of bleeding is further suppressed even at a very high linear velocity in the range of 50 to 120 m/min, which is applicable in the single-pass inkjet image forming method, and an image having high fixability may be obtained.

By containing the above water-insoluble resin particles in the pretreatment liquid, it is possible to improve the fixability of the image (coating film) on the recording medium of the low-absorbent substrate or the non-absorbent substrate. In particular, by using the silicone surfactant represented by Formula (1), it is possible to uniformly and easily spread the ink on a low-absorbent substrate such as PP or PET or a non-absorbent substrate. Therefore, it is possible to improve the fixability of the image (coating film) on the recording medium of the low-absorbent substrate or the non-absorbent substrate.

(5.4) Ink Drying Step

In the ink drying step, the ink applied on the recording medium of the low-absorbent substrate or the non-absorbent substrate is dried.

Drying the ink mainly removes water and water-soluble organic solvent, which are solvent components of the ink. The drying temperature of the ink is preferably in the range of 50 to 100° C., for example. The drying time of the ink is preferably in the range of 3 to 30 seconds, for example.

The ink may be dried by the same method as the above-mentioned drying of the pretreatment liquid. Also, the drying temperature of the ink may be measured in the same manner as the drying temperature in the above-mentioned pretreatment liquid drying step.

The image forming method of the present invention may be performed on a film stored in a roll.

(6) Inkjet Image Forming Apparatus

As shown in the FIGURE, the inkjet image forming apparatus 100 according to the present invention is provided with: a head carriage 120 having an inkjet head that ejects droplets of an inkjet ink of an inkjet recording liquid set to land on a region on a low-absorbent substrate or a non-absorbent substrate 110 (hereinafter simply referred to as "substrate"); and a pretreatment liquid application unit 130 which applies the above-mentioned pretreatment liquid to the substrate 110. The inkjet image forming apparatus 100 may further include a dryer 140 for drying the pretreatment liquid applied to the surface of the substrate.

In the FIGURE, the pretreatment liquid application unit 130 and the head carriage 120 are arranged in this order from the upstream side along the transport direction of the substrate 110 (the direction of the arrow in the drawing). The arrangement order of these is not limited to this order and may be set arbitrarily.

However, it is preferable that the pretreatment liquid application unit 130 and the head carriage 120 are arranged in this order.

The head carriage 120 is equipped with, for example, four inkjet heads 121. Yellow, magenta, cyan, and black inks are ejected from the nozzles 122 of the respective inkjet heads 121, and the ink droplets of the inkjet ink are landed on the areas of the substrate 110 to be landed.

The pretreatment liquid application unit 130 may have any configuration as long as it may apply the pretreatment liquid to an area wider than the area on the substrate 110 on which the droplets of the inkjet ink land. For example, the pretreatment liquid application unit 130 may be configured to include a dispenser 132 that supplies the pretreatment liquid to the coating roller 131, and a coating roller 131 that coats the supplied pretreatment liquid in a film shape.

The configuration of the pretreatment liquid application unit 130 is not limited to this, and the pretreatment liquid may be ejected from the inkjet head 121 and landed on the substrate 110.

The dryer 140 may be a known dryer such as a warm-air dryer that blows hot air and an irradiator that irradiates infrared rays or ionizing radiation. The dryer 140 is provided downstream of the pretreatment liquid application unit 130 and upstream of the head carriage 120, and dries the pretreatment liquid before the ejection of inkjet ink droplets.

Although the embodiments of the present invention have been described and illustrated in detail, the disclosed embodiments are made for purpose of illustration and example only and not limitation. The scope of the present invention should be interpreted by terms of the appended claims.

EXAMPLES

Hereinafter, the present invention will be specifically described with reference to examples, but the present invention is not limited thereto. In the following examples, the operations were performed at room temperature (25° C.) unless otherwise specified. Further, unless otherwise specified, "%" and "part" mean "mass %" and "part by mass", respectively.

(1) Preparation of Inkjet Ink for Inkjet Recording Liquid Set

The inkjet ink of the inkjet recording liquid set was prepared as follows.
<Organic Solvent>

As the organic solvent, the following A-1 to A-3 were used.

A-1: 1,2-Butanediol (alkanediol)
A-2: Propylene glycol (glycol)
A-3: 1,4-Butanediol (alkanediol)
<Surfactant>

As surfactants, S-1 to S-8 synthesized in Synthetic Examples below, and S-9 to S-11 commercially available were used.

Synthetic Example of Surfactant S-1

A five-necked flask equipped with a stirrer, a refluxing condenser tube, a dropping funnel, a thermometer, and a nitrogen-introducing tube was charged with 450 parts by mass of allylated polyether (UNIOX PKA-5008 manufactured by Nippon Oil Co., Ltd.) and 0.01 parts by mass of hexachloroplatinic (IV) hexahydrate $H_2PtC_6$ $6H_2O$ (manufactured by Tokyo Chemical Industries, Ltd.) and nitrogen substitution was conducted. The mixture was heated to 70° C., then 220 parts by mass of heptamethyltrisiloxane (manufactured by Aldrich Co., Ltd.) was dropped over 1 hour, and the reaction vessel was allowed to warm to 110° C. for 4 hours. After the reaction, the unreacted material was distilled off under reduced pressure to obtain a silicone surfactant S-1 which was the target silicone surfactant. The obtained silicone surfactant S-1 is a silicone surfactant corresponding to R=a methyl group, X=an alkylene group having 3 carbon atoms, m=9, n=0 in Formula (1).

Synthetic Example of Surfactant S-2

A silicone surfactant S-2 was obtained in the same manner as in the synthetic example of the surfactant S-1 except that 1,600 parts by mass of an allylated polyether (UNISAFE PKA-5015 manufactured by Nippon Oil Co., Ltd.) was used instead of 450 parts by mass of an allylated polyether (UNIOX PKA-5008 manufactured by Nippon Oil Co., Ltd.). TI obtained silicone surfactant S-2 is a silicone surfactant corresponding to R=a butyl group, X=an alkylene group having 3 carbon atoms, m=25, n=6 in Formula (1).

Synthetic Example of Surfactant S-3

A silicone surfactant S-3 was obtained in the same manner as in the synthetic example of the surfactant S-1 except that 200 parts by mass of an allylated polyether (UNIOX PKA-5001 manufactured by Nippon Oil Co., Ltd.) was used instead of 450 parts by mass of an allylated polyether (UNIOX PKA-5008 manufactured by Nippon Oil Co., Ltd.). TI obtained silicone surfactant is a silicone surfactant corresponding to R=a hydrogen atom, X=an alkylene group having 3 carbon atoms, m=3, n=0 in Formula (1).

Synthetic Example of Surfactant S-4

A silicone surfactant S-4 was obtained in the same manner as in the synthetic example of the surfactant S-1 except that 1,500 parts by mass of an allylated polyether (UNIOX PKA-5005 manufactured by Nippon Oil Co., Ltd.) was used instead of 450 parts by mass of an allylated polyether (UNIOX PKA-5008 manufactured by Nippon Oil Co., Ltd.). TI obtained silicone surfactant is a silicone surfactant corresponding to R=a hydrogen atom, X=an alkylene group having 3 carbon atoms, m=33, n=0 in Formula (1).

Synthetic Example of Surfactant S-5

A silicone surfactant S-5 was obtained in the same manner as in the synthetic example of the surfactant S-1 except that 2,000 parts by mass of an allylated polyether (UNIOX PKA-5013 manufactured by Nippon Oil Co., Ltd.) was used instead of 450 parts by mass of an allylated polyether (UNIOX PKA-5008 manufactured by Nippon Oil Co., Ltd.). TI obtained silicone surfactant is a silicone surfactant corresponding to R=a hydrogen atom, X=an alkylene group having 3 carbon atoms, m=22, n=16 in Formula (1).

Synthetic Example of Surfactant S-6

A silicone surfactant S-6 was obtained in the same manner as in the synthesis example of the surfactant S-1 except that 450 parts by mass of an allylated polyether (UNIOX PKA-5003 manufactured by Nippon Oil Co., Ltd.) was used instead of 450 parts by mass of an allylated polyether (UNIOX PKA-5008 manufactured by Nippon Oil Co., Ltd.). TI obtained silicone surfactant is a silicone surfactant corresponding to R=a hydrogen atom, X=an alkylene group having 3 carbon atoms, m=9, n=0 in Formula (1).

Synthetic Example of Surfactant S-7

A silicone surfactant S-7 was obtained in the same manner as in the synthesis example of the surfactant S-1 except that 750 parts by mass of an allylated polyether (UNISEFE PKA-5011 manufactured by Nippon Oil Co., Ltd.) was used instead of 450 parts by mass of an allylated polyether (UNIOX PKA-5008 manufactured by Nippon Oil Co., Ltd.). The obtained silicone surfactant is a silicone surfactant corresponding to R=a hydrogen atom, X=an alkylene group having 3 carbon atoms, m=12, n=3 in Formula (1).

Synthetic Example of Surfactant S-8

A silicone surfactant S-8 was obtained in the same manner as in the synthesis example of the surfactant S-1 except that 105 parts by mass of ethylene glycol monoallyl ether (manufactured by Tokyo Chemical Industry Co., Ltd.) was used instead of 450 parts by mass of allylated polyether (UNIOX PKA-5008 manufactured by Nippon Oil Co., Ltd.). The obtained silicone surfactant is a silicone surfactant corresponding to R=a hydrogen atom, X=an alkylene group having 3 carbon atoms, m=1, n=0 in Formula (1).

The following commercial products were used as the surfactants S-9 to S-11.
S-9: BYK-333 (manufactured by BYK-Chemie)
S-10: BYK-348 (manufactured by BYK-Chemie)
S-11: SILFACE SAG503A (manufactured by Nisshin Chemical Co., Ltd.)

<Preparation of Pigment Dispersion Liquid G-1>

As a self-dispersing pigment dispersion liquid, a self-dispersing cyan pigment water dispersion liquid "CAB-O-JET 450C pigment (Pigment Blue 15:3)" made by Cabot Co., solid content 14% was used.

<Preparation of Pigment Dispersion Liquid G-2>

A pigment dispersion liquid G-2 was prepared by pre-mixing a mixture of 18 mass % of pigment (Pigment Blue 15:3), 31.5 mass % of a pigment dispersant (JONCRYL 819 manufactured by BASF Corporation, an acid value of 75 mg KOH/g, a solid content of 20 mass %), 20 mass % of ethylene glycol, and ion-exchanged water (remaining amount: a total amount of 100% by mass). Then the mixture was dispersed using a sand grinder filled with 50 volume % of 0.5 mm zirconia beads to obtain a pigment dispersion liquid G-2 having a pigment content of 18 mass %. The average particle diameter of the pigment particles contained in the pigment dispersion 2 was 110 nm. The average particle diameter of the particles was measured by "Zeta-sizer 1000Hs" made by Malvern Panalytical Ltd.

<Preparation of Aqueous Inkjet Ink I1>

17.00 parts by mass of the pigment dispersion liquid G-1, 10.00 parts by mass of 1,2-butanediol (A-1), 20.00 parts by mass of propylene glycol (A-2) and 10.00 parts by mass of 1,4-butanediol (A-3) as organic solvents, 0.05 parts by mass of a surfactant (S-1) and ion-exchanged water (remaining amount; 42.95 parts by mass) were added while stirring. The resulting mixture was filtered through a 1 μm filter to obtain an aqueous inkjet ink I1. There was no substantial change in composition before and after filtration.

<Preparation of Aqueous Inkjet Inks I2 and I3>

Aqueous inkjet inks I2 and I3 were prepared in the same manner as used for the preparation of the aqueous inkjet ink I1 except that the composition was changed to that indicated in Table I below.

<Preparation of Aqueous Inkjet Ink I4>

17.00 parts by mass of the pigment dispersion liquid G-2, 10.00 parts by mass of 1,2-butanediol (A-1), 20.00 parts by mass of propylene glycol (A-2), and 10.00 parts by mass of 1,4-butanediol (A-3) as organic solvents, 1.00 parts by mass of surfactant (S-2) and ion-exchanged water (remaining amount; 42.00 parts by mass) were added while stirring. The resulting mixture was filtered through a 1 μm filter to obtain an aqueous inkjet ink I4. There was no substantial change in composition before and after filtration.

<Preparation of Aqueous Inkjet Inks I5 to I13>

Aqueous inkjet inks I5 to I13 were prepared in the same manner as used for the preparation of the aqueous inkjet ink I4 except that the composition was changed to that indicated in Table I below.

TABLE I

| Aqueous inkjet ink composition | | I1 | I2 | I3 | I4 | I5 | I6 | I7 | I8 | I9 | I10 | I11 | I12 | I13 |
|---|---|---|---|---|---|---|---|---|---|---|---|---|---|---|
| Organic solvent | A-1 | 10.00 | 10.00 | 10.00 | 10.00 | 10.00 | 10.00 | 10.00 | 10.00 | 10.00 | 10.00 | 10.00 | 10.00 | 10.00 |
| | A-2 | 20.00 | 20.00 | 20.00 | 20.00 | 20.00 | 20.00 | 20.00 | 20.00 | 20.00 | 20.00 | 20.00 | 20.00 | 20.00 |
| | A-3 | 10.00 | 10.00 | 10.00 | 10.00 | 10.00 | 10.00 | 10.00 | 10.00 | 10.00 | 10.00 | 10.00 | 10.00 | 10.00 |
| Surfactant | S-1 | 0.05 | 3.50 | 1.00 | — | — | — | — | — | — | — | — | — | — |
| | S-2 | — | — | — | 1.00 | — | — | — | — | — | — | — | — | — |
| | S-3 | — | — | — | — | 1.00 | — | — | — | — | — | — | — | — |
| | S-4 | — | — | — | — | — | 1.00 | — | — | — | — | — | — | — |
| | S-5 | — | — | — | — | — | — | 1.00 | — | — | — | — | — | — |
| | S-6 | — | — | — | — | — | — | — | 1.00 | — | — | — | — | — |

Unit: Part by mass

TABLE I-continued

| Aqueous inkjet ink composition | | I1 | I2 | I3 | I4 | I5 | I6 | I7 | I8 | I9 | I10 | I11 | I12 | I13 |
|---|---|---|---|---|---|---|---|---|---|---|---|---|---|---|
| | S-7 | — | — | — | — | — | — | — | — | 1.00 | — | — | — | — |
| | S-8 | — | — | — | — | — | — | — | — | — | 1.00 | — | — | — |
| | S-9 | — | — | — | — | — | — | — | — | — | — | 1.00 | — | — |
| | S-10 | — | — | — | — | — | — | — | — | — | — | — | 1.00 | — |
| | S-11 | — | — | — | — | — | — | — | — | — | — | — | — | 1.00 |
| Pigment dispersant | G-1 | 17.00 | 17.00 | 17.00 | — | — | — | — | — | — | — | — | — | — |
| | G-2 | — | — | — | 17.00 | 17.00 | 17.00 | 17.00 | 17.00 | 17.00 | 17.00 | 17.00 | 17.00 | 17.00 |
| Water | | 42.95 | 39.50 | 42.00 | 42.00 | 42.00 | 42.00 | 42.00 | 42.00 | 42.00 | 42.00 | 42.00 | 42.00 | 42.00 |
| Total mass parts of inkjet ink | | 100.00 | 100.00 | 100.00 | 100.00 | 100.00 | 100.00 | 100.00 | 100.00 | 100.00 | 100.00 | 100.00 | 100.00 | 100.00 |

Unit: Part by mass (2) Preparation of Pretreatment Liquid for Inkjet Recording Liquid Set Next, the pretreatment liquid of the inkjet recording liquid set was prepared as follows.

<Water-Insoluble Resin Particles>

As the water-insoluble resin particles, the following commercial products (C-1 to C-3) and the urethane/polyolefin composite resin (C-4) prepared below were used.

C-1: Elitel KT-0507 (polyester resin, manufactured by Unitika Corporation)

C-2: WBR-016U (urethane emulsion, manufactured by Taisei Fine Chemical Co., Ltd.)

C-3: WEM-202U (acrylic urethane emulsion, manufactured by Taisei Fine Chemical Co., Ltd.)

C-4: Urethane-polyolefin composite resin prepared as follows (Synthesis of Urethane Prepolymer Solution)

A four-necked flask equipped with a stirrer, a reflux cooling tube, a thermometer, and a nitrogen-introducing tube was charged with 182.0 parts by mass of polyester polyol, 22.0 parts by mass of polyethylene glycol (molecular weight 600), 5.6 parts by mass of trimethylolpropane, 43.8 parts by mass of N-methyl-N,N-diethanolamine, 204.0 parts by mass of 4,4'-dicyclohexylmethane diisocyanate, and 216.0 parts by mass of methyl ethyl ketone. Then the reaction was carried out while maintaining at 75° C. to obtain urethane prepolymer. To this urethane prepolymer was added with 46.4 parts by mass of dimethyl sulfuric acid and reacted at 50 to 60° C. for 30 to 60 minutes to obtain a urethane prepolymer solution having an NCO content of 2.2% and a nonvolatile content of 50%.

(Preparation of Urethane-Polyolefin Composite Resin C-4)

In a four-necked flask equipped with a stirrer, a reflux cooling tube, a thermometer, and a nitrogen-introducing tube 3.0 parts by mass of polyolefin resin "AUROREN 150S" (manufactured by Nippon Paper Industries Co., Ltd., "AUROREN" is a registered trademark of the same company), 240.0 parts by mass of methylcyclohexane, and 48.0 parts by mass of methyl ethyl ketone were added, and the temperature was raised to 80° C. and the mixture was heated and dissolved. After dissolution, the internal temperature was maintained at 40° C., and 194.0 parts by mass of the above-mentioned urethane prepolymer solution (nonvolatile content: about 50%) was added and mixed. To this solution, 58.0 parts by mass of ion-exchanged water was added, and after emulsification was performed using a homogenizer, 570.0 parts by mass of ion-exchanged water was gradually added and diluted. Then an aqueous solution in which 1.0 part by mass of ethylenediamine and 12.0 parts by mass of ion-exchanged water were mixed was gradually added and stirred for 1 hour to perform polymerization. This was subjected to desolvation under a reduced pressure at 50° C. to obtain a urethane/polyolefin composite resin C-4 having a nonvolatile content (solid content as particles) of 30.0 mass %.

<Water-soluble Resin>

The following D-1 was used as the water-soluble resin.

D-1: "Pluscoat Z-221" (manufactured by Goo Chemical Co., Ltd., "Pluscoat" is a registered trademark of the same company)

<Pigment Coagulant>

The following E-1 to E-3 were used as pigment coagulants.

E-1: Cationic polymer "PAS-H-1L" manufactured by Nittobo Medical Co., Ltd.

E-2: Organic acid (glutaric acid)

E-3: Polyvalent metal salt (calcium chloride)

(Surfactant)

The following F-1 was used as a surfactant.

F-1: BYK-333 (manufactured by BYK-Chemie)

<Preparation of Pretreatment Liquid P1>

The components shown below were sequentially added with stirring, and then filtered through a 5.0 μm filter to obtain a pretreatment liquid P1. The composition did not change substantially before and after filtration.

| | |
|---|---|
| Water-insoluble resin particles (C-1): | 18.00 parts by mass |
| Pigment coagulant (E-1): | 4.00 parts by mass |
| Surfactant (F-1): | 1.00 part by mass |
| Ion-exchanged water: | 77.00 parts by mass |

<Preparation of Pretreatment Liquids P2 to P7>

Pretreatment liquids P2 to P7 were prepared in the same manner as used for the preparation of the pretreatment liquid P1 except that the composition was changed to that shown in Table II below.

TABLE II

| Pretreatment liquid composition | | | P1 | P2 | P3 | P4 | P5 | P6 | P7 |
|---|---|---|---|---|---|---|---|---|---|
| Resin | Water-insoluble resin particles | C-1 | 18.00 | 18.00 | — | — | — | 18.00 | — |
| | | C-2 | — | — | 18.00 | — | — | — | — |

Unit: Part by mass

TABLE II-continued

| Pretreatment liquid composition | | | P1 | P2 | P3 | P4 | P5 | Unit: Part by mass P6 | P7 |
|---|---|---|---|---|---|---|---|---|---|
| | | C-3 | — | — | — | 18.00 | — | — | — |
| | | C-4 | — | — | — | — | 18.00 | — | — |
| | Water soluble resin | D-1 | — | — | — | — | — | — | 18.00 |
| Pigment dispersant | Cationic polymer | E-1 | 4.00 | — | — | — | — | — | — |
| | Organic acid | E-2 | — | 4.00 | 4.00 | — | — | — | 4.00 |
| | Polyvalent metal salt | E-3 | — | — | — | 4.00 | 4.00 | — | — |
| Surfactant | | F-1 | 1.00 | 1.00 | 1.00 | 1.00 | 1.00 | 1.00 | 1.00 |
| Water | | | 77.00 | 77.00 | 77.00 | 77.00 | 77.00 | 81.00 | 77.00 |
| Total mass parts of pretreatment liquid | | | 100.00 | 100.00 | 100.00 | 100.00 | 100.00 | 100.00 | 100.00 |

(3) Evaluation

Images 1 to 22 were formed using the prepared inkjet inks I1 to I13 and the prepared pretreatment liquids P1 to P7, and the image quality, ejection stability, substrate adhesiveness, and hot water resistance were evaluated for each image.

<Image Formation for Evaluation>

Images 1 to 22 for evaluation were formed by the following method.

(Formation of Pretreatment Layer)

Pretreatment liquids P1 to P7 were applied onto a non-absorbent substrate (OPP film, trade name: FOS, manufactured by Futamura Corporation)) using a bar coater #10, followed by drying at 60° C. for 5 minutes to prepare a recording medium having a pretreatment layer with a thickness of 3.2 μm.

(Formation of Printing Layer)

The inkjet inks I1 to I13 were set in an inkjet recording apparatus (manufactured by Konica Minolta, Inc., 360 dpi, discharge rate 14 μL) having an inkjet recording head of a piezo-type inkjet nozzle. The inkjet recording apparatus was provided with two independently driven heads arranged so that the nozzles were staggered with a head module of 720 dpi×720 dpi and installed on a stage conveying machine so that the nozzle rows were orthogonal in the conveying direction. An inkjet recording apparatus was configured so that the head module was filled with inkjet inks I1 to I13 and a solid image was recorded by a single-pass method on a pretreatment layer formed on a surface of a substrate conveyed by a stage conveyor. Using the above head, inkjet ink droplets were ejected so that a solid image of 720 dpi×720 dpi with an ink coverage of 11.2 ml/m² was formed.

<Evaluation of Image Quality>

(Evaluation Method)

The images produced by the above method were visually evaluated. In the evaluation described below, AA, BB, and CC were judged to be preferable for practical use.

(Evaluation Criteria)

AA: A good image with excellent ink wettability, uniform image density without unevenness, and no ink dropout.

BB: A practically acceptable image with good ink wettability, having a portion of non-uniform density but no ink dropout.

CC: An image in which the ink wettability is slightly insufficient and there is a portion where the ink has dropout, and there is a slight amount of white spots DD: An image in which the ink wettability is insufficient, and there are many areas where the ink has dropout, and white spots are noticeable.

<Evaluation of Discharge Stability>

(Evaluation Method)

After leaving the recording apparatus used for forming the above image at 25° C. and 50% RH for 1 hour, 100 sheets of solid images (100% printing) were successively printed under the conditions of a printing width of 100 nm×100 nm and a resolution of 720×720 dpi. Thereafter, continuous ejection (driving) was performed under the conditions that the droplet amount was 3.5 pl, the droplet velocity was 7.0 m/sec, the ejection frequency was 40 kHz, and the printing rate was 100%, and the number of head nozzles missing was measured.

(Evaluation Criteria)

Evaluation was performed according to the following criteria. In the evaluation described below, AA, BB, and CC were judged to be preferable for practical use.

AA: Without missing nozzle

BB: Nozzle missing of 1 to 3

CC: Nozzle missing of 4 to 6

DD: Nozzle missing of 7 or mom

<Evaluation of Adhesiveness to Substrate>

(Evaluation Method)

The solid image created by the above-mentioned recording method was cut with a cutter in a 5×5 grid pattern at 1 mm intervals, and a tape peeling test by a cross cut method was performed.

(Evaluation Criteria)

Evaluation was performed according to the following criteria. In the evaluation described below, AA, BB, and CC were judged to be preferable for practical use.

AA: No peeling by tape and it is an excellent level

BB: There is peeling of 1 to 3 squares of cuts in a grid pattern, but it is a good level.

CC: There is peeling of 4 to 6 squares of cuts in a grid pattern, but it is a practically acceptable level.

DD: There is peeling of 7 or mom squares of cuts in a grid pattern, it is practically unacceptable level.

<Evaluation of Hot Water Resistance>

(Evaluation Method)

The above images 1 to 22 were stored at 40° C. for 3 days, and then cut into strips of 10 cm×1 cm so that the solid portion became a cut end surface to obtain test pieces. The test piece was treated with hot water for 30 minutes, and the state of the test piece after the process was visually confirmed, and the hot water resistance of the image by each ink was evaluated by the following criteria.

(Evaluation Criteria)

Evaluation was performed according to the following criteria. In the evaluation described below, AA, BB, and CC were judged to be preferable for practical use.

AA: No peeling of the test piece
BB: Partial peeling of the test piece occurred, but no significant peeling occurred.
CC: Large peeling of the test piece occurred.
DD: All image portions are peeled off from the test piece film.

TABLE III

| Image No. | Inkjet ink No. | Pretreatment liquid No. | Evaluation | | | | Remarks |
| | | | Image quality | Ejection stability | Base material adhesiveness | Hot water resistance | |
| --- | --- | --- | --- | --- | --- | --- | --- |
| 1 | I1 | P1 | CC | BB | CC | CC | Present Invention |
| 2 | I2 | P1 | CC | CC | CC | BB | Present Invention |
| 3 | I3 | P1 | BB | AA | CC | BB | Present Invention |
| 4 | I4 | P1 | BB | AA | CC | AA | Present Invention |
| 5 | I4 | P2 | AA | AA | CC | AA | Present Invention |
| 6 | I5 | P2 | AA | BB | CC | BB | Present Invention |
| 7 | I6 | P2 | AA | BB | CC | BB | Present Invention |
| 8 | I7 | P3 | AA | AA | BB | AA | Present Invention |
| 9 | I8 | P3 | AA | BB | BB | BB | Present Invention |
| 10 | I9 | P3 | AA | AA | BB | AA | Present Invention |
| 11 | I4 | P4 | AA | AA | AA | AA | Present Invention |
| 12 | I5 | P4 | AA | BB | AA | BB | Present Invention |
| 13 | I6 | P4 | AA | BB | AA | BB | Present Invention |
| 14 | I7 | P5 | AA | AA | AA | AA | Present Invention |
| 15 | I8 | P5 | AA | BB | AA | BB | Present Invention |
| 16 | I9 | P5 | AA | AA | AA | AA | Present Invention |
| 17 | I3 | P6 | DD | AA | CC | AA | Comparative Example |
| 18 | I3 | P7 | BB | AA | DD | AA | Comparative Example |
| 19 | I10 | P3 | DD | CC | CC | CC | Comparative Example |
| 20 | I11 | P3 | DD | CC | CC | CC | Comparative Example |
| 21 | I12 | P3 | DD | CC | CC | CC | Comparative Example |
| 22 | I13 | P3 | DD | CC | CC | CC | Comparative Example |

As shown in the above-described results, it was found that the inkjet recording liquid set of the present invention was superior to the inkjet recording liquid set of the comparative example in terms of image quality, ejection stability, substrate adhesiveness, and hot water resistance.

What is claimed is:

1. An inkjet recording liquid set comprising at least an inkjet ink and a pretreatment liquid,
wherein the inkjet ink contains at least a pigment, an organic solvent, water and a silicone surfactant;
the pretreatment liquid contains at least water-insoluble resin particles and a pigment coagulant; and
the silicone surfactant has a structure represented by the following Formula (1),

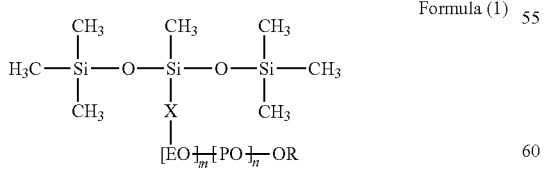

Formula (1)

in Formula (1), R represents a hydrogen atom or a hydrocarbon group having 1 to 4 carbon atoms; X is an alkylene group having 2 to 6 carbon atoms and may have a branched structure; EO represents an ethylene oxide group, PO represents a propylene oxide group, and an order of EO and PO is random; m and n represent a number of repeating unit structures, m is an integer of 2 to 50, and n is an integer of 0 to 20.

2. The inkjet recording liquid set described in claim 1, wherein a content of the silicone surfactant is in the range of 0.1 to 3.0 mass % with respect to the inkjet ink.

3. The inkjet recording liquid set described in claim 1, further containing a pigment dispersant.

4. The inkjet recording liquid set described in claim 1, wherein the pigment coagulant is a polyvalent metal salt or an organic acid.

5. The inkjet recording liquid set described in claim 1, wherein the water-insoluble resin particles contain a polyurethane resin.

6. The inkjet recording liquid set described in claim 1, wherein the water-insoluble resin particles are composite resin particles in which a polyolefin resin or a polyacrylic resin is emulsified in a polyurethane resin.

7. A printed matter comprising: a printing layer containing the inkjet ink; and a pretreatment layer containing the pretreatment liquid, wherein the inkjet ink and the pretreatment liquid are contained in the inkjet recording liquid set described in claim 1.

8. An inkjet recording method containing the step of recording an image on a recording medium of a low-absorbent substrate or a non-absorbent substrate by using the inkjet recording liquid set described in claim 1.

9. The inkjet recording liquid set described in claim 1, wherein the water-insoluble resin particles are formed from a polyester resin, a polyolefin resin, a polyurethane resin, or a composite resin composed of a polyolefin resin and a polyurethane resin.

* * * * *